United States Patent
Robinson

(10) Patent No.: US 6,374,202 B1
(45) Date of Patent: *Apr. 16, 2002

(54) PROCESSING DATA SIGNALS

(75) Inventor: Gerald Robinson, Ipswich (GB)

(73) Assignee: British Telecommunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,934

(22) PCT Filed: Jul. 9, 1997

(86) PCT No.: PCT/GB97/01842

§ 371 Date: Mar. 10, 1998

§ 102(e) Date: Mar. 10, 1998

(87) PCT Pub. No.: WO98/03023

PCT Pub. Date: Jan. 22, 1998

(30) Foreign Application Priority Data

Jul. 16, 1996 (GB) ............................................. 9614927

(51) Int. Cl.[7] .......................... G06F 17/50; G06F 15/18; G06F 15/177; G06F 15/173; G06G 7/62

(52) U.S. Cl. ........................... 703/13; 703/20; 709/220; 709/223; 706/13

(58) Field of Search ............................. 703/13, 14, 21, 703/23, 24; 709/223, 224, 220, 221, 222

(56) References Cited

U.S. PATENT DOCUMENTS

| | | | |
|---|---|---|---|
| 5,067,148 A | | 11/1991 | Sardana |
| 5,129,037 A | * | 7/1992 | Kirk et al. ..................... 706/16 |
| 5,136,686 A | * | 8/1992 | Koza ............................ 706/13 |
| 5,140,530 A | * | 8/1992 | Guha et al. ................... 706/13 |
| 5,148,513 A | * | 9/1992 | Koza et al. ................... 706/13 |
| 5,276,789 A | * | 1/1994 | Besaw et al. ................ 395/140 |
| 5,295,244 A | * | 3/1994 | Dev et al. .................... 709/223 |
| 5,343,554 A | * | 8/1994 | Koza et al. ..................... 706/13 |
| 5,440,675 A | * | 8/1995 | Matsunaga et al. .......... 395/140 |
| 5,583,860 A | * | 12/1996 | Iwakawa et al. ............. 370/232 |
| 5,598,532 A | * | 1/1997 | Liron ..................... 395/500.23 |
| 5,657,142 A | * | 8/1997 | Fahim ......................... 359/110 |
| 5,680,326 A | * | 10/1997 | Russ et al. ..................... 714/4 |
| 5,715,432 A | * | 2/1998 | Xu et al. ....................... 703/13 |
| 5,726,979 A | * | 3/1998 | Henderson et al. .......... 370/254 |
| 5,734,811 A | * | 3/1998 | Croslin .......................... 714/4 |
| 5,748,617 A | * | 5/1998 | McLain, Jr. .................. 703/14 |
| 5,761,502 A | * | 6/1998 | Jacobs ......................... 709/242 |
| 5,794,224 A | * | 8/1998 | Yufik ........................... 706/14 |
| 5,867,397 A | * | 2/1999 | Koza et al. ............ 395/500.35 |

OTHER PUBLICATIONS

"Piece Polynomial Kernel Networks", Heredia et al., IEEE 1996.*
"A genetic based fuzzy approach to optimization of electrical distribution networks", Strbac et al., IEEE 1995.*
"Topology design of local area networks genetic Algorithms", Sibi et al., IEEE 1996.*

(List continued on next page.)

*Primary Examiner*—Kevin J. Teska
*Assistant Examiner*—William Thomson
(74) *Attorney, Agent, or Firm*—Nixon & Vanderhye P.C.

(57) ABSTRACT

A network's components are represented in the form of data signals arranged into a hierarchical tree structure. A population comprising a large number of randomly created tree structures, each relating to an individual network, is generated. The tree structures undergo a process of evolution through successive generations, by selectively breeding the most successful tree structures. Through the process of breeding, one or a plurality of optimal tree structures emerges. A network is constructed in accordance with the data signals represented by the optimal tree structure. The network may be any network comprising a set of nodes and links, e.g. a gas pipeline network, an electricity supply network, a water pipeline network or the like, but the disclosure is particularly relevant to a telecommunications network or a computer network.

14 Claims, 22 Drawing Sheets

OTHER PUBLICATIONS

"Topology design of local area networks genetic Algorithms", Elbaum et al., IEEE 1995.*

"Charley:a genetic algorithm for the design of mesh networks" Hewitt et al., IEEE 1995.*

"Optimizing logical topology of lightwave network architcture (LNA) using genetic algorithms", Abed et al., Mar. 1996.*

"A Tool for Graphical Network Modeling and Analysis", Zijl et al., IEEE 1992.*

"Graphical Interface for Communication Network Analysis and Simulation", Vinyes et al., 5/91, IEEE 1991.*

"END: An Expert Network Designer", Fahmy et al., IEEE Network, Nov./Dec. 1995, IEEE 1995.*

"An Extension of a CACSD Package for Network Analysis: Metanet", Gomez et al., 5/94, IEEE 1994.*

"NETPLAN—A Telecommunications Network Planning Support System", Chew et al., 2/92, IEEE 1992.*

"A Flexible Graphical User Interface for Performance Modeling", Lin et al., 6/94, IEEE 1994.*

"Network II.5 Tutorial: Network Modeling Without Programming", Garrison, Proceedings of the 1990 Winter Simulation Conference, IEEE 1990.*

"A Simulation Model for Assessing Network Capacity", Hajare et al., Proceedings of the 1993 Winter Simulation Conference, IEEE 1993.*

"An Algorithm for Survivable Network Design Employing Multiple Self Healing Rings", Slevinsky et al., IEEE 1993.*

"Performance Evaluation and Modeling for Dynamic Routing in Direct Multicomputer Networks", Ben–Ayed et al., IEEE 1990.*

"Telecommunications Network Analysis with COMNET II.5", Mills, Proceedings of the 1988 Winter Simulation Conference, IEEE 1988.*

"Communication Network Analysis with COMNET II.5", Mills, Proceedings of the 1989 Winter Simulation Conference, IEEE 1989.*

"NETWORK II.5, LANNET II.5 and COMNET II.5", Garrison, Proceedings of the 1991 Winter Simulation Conference, IEEE 1991.*

"Support System to Construct Distributed Communications Networks", Yagyu et al., 7/93. IEEE 1993.*

"COMNET III: Object Oriented Network Performance Prediction", Goble et al., Proceedings of the 1994 Winter Simulation Conference, IEEE 1994.*

"COMNET III: Object Oriented Network Performance Prediction" Mills, Proceedings of the 1993 Winter Simulation Conference, IEEE 1993.*

"Modeling and Simulation of ATM/BISDN Enterprise Networks", Akhtar, IEEE 1994.*

"Global Communications Network Modeling Tools", Cohen et al., IEEE 1988.*

"Performance Analysis of a High Speed Dynamically Reconfigurable LAN", AlKasabi et al., IEEE 1995.*

"FDDI–ATM Internetworking Simulation", Tony et al., IEEE 1995.*

"A Modular Approach in the Simulation of High Speed Networks", Ng et al., IEEE 1994.*

"COMNET III", High Fidelity Network Simulation, Product Description for 1995 version. Internet Site: www.csciasl.com. 1999.*

"OPNET Modeler", Modeling Methodology and Model Hierarchy, Product Description for 1995 version. Internet Site: www.mil3.com 1999.*

Craveirinha, et al., *A Survey of Applications of Mathematical Programming to Circuit–Switched Network Planning Problems*, Sep./Oct., 1992, pp. 499–515.

Mase, et al., Traffic Design Method for Large–Scale Switched Telecommunication Networks, Electronics and Communication in Japan, Aug., 1995, pp. 10–22.

Gruszecki, et al., Some New Concepts in Demand and Traffic Forecasting and Planning of Future Telecommunication Services, Computer Networks and ISDN Systems, Dec., 1990, pp. 65–74.

Ikeuchi, Network Constructing Algorithm Based on Link Significance Evaluation–NABLE, Electronics and Communications in Japan, Feb., 1990, pp. 30–41.

Maymon, An Information Model for Configuration Management of Switching Network Elements, Using OSI Tools, IEEE, 1991, pp. 118–122.

Rouvellou, et al., Topology Identification for Traffic and Configuration Management in Dynamic Networks, IEEE, 1992, pp. 2197–2204.

Matsuo, et al., Implementation Model and Execution Environment for Flexible Configuration of Telecommunication Information Systems, IEICE Transactions on Communications, Nov., 1994, pp. 1312–1321.

Deiretsbacher, et al., CNMA, A European Initiative for OSI Network Management, IEEE, Jan./Feb., 1995, pp. 44–52.

Stinson, et al., A State–Based Approach to Real–Time Telecommunications Network Management, IEEE, Jan., 1992, pp. 520–532.

Oliveria, et al., A Methodology to Represent Logical Network Topology Information, IEEE, Feb., 1994, pp. 196–206.

* cited by examiner

RANDOMLY GENERATED DESIGN

FINAL OPTIMISED DESIGN

PROCESSING DATA SIGNALS

This application is a 371 of PCT/GB97/01842 filed Jul. 9, 1997.

The present invention relates to a network of nodes and links designed and/or optimized using a genetic process, and particularly, although not exclusively to a communications network.

INTRODUCTION

There are numerous examples of utility service networks which comprise a plurality of nodes interconnected by a plurality of links. Services are transferred between node equipment at the nodes along link equipment. Examples of such networks include electricity supply networks, in which the links comprise high voltage power cables and the nodes comprise power stations, generators, substations and the like; water supply networks in which the node equipment comprises reservoirs, valves, water towers, and customer sites, and the links comprise supply pipelines; gas supply networks where the node equipment comprises sea platforms, storage tanks, customer sites, distribution centres and valves, and the links comprise gas pipelines; Intercity road networks in which the nodes comprise towns or cities and the links comprise roads, and similarly railway networks and airline networks, and more particularly communications networks such as a computer network in which the nodes may comprise computer equipment and the links may comprise communication links, or telephony service communications networks, in which the nodes may comprise exchange equipment, and the links may comprise terrestrial, undersea, airborne or satellite communications channels.

Taking the example of the telephone service network, a conventional telecommunications network comprises a plurality of exchanges for connecting and directing communications channels between customer sites, and a plurality of communications links connecting the exchanges and the customer sites. A customer site may comprise a single piece of equipment, for example a single telephone handset, or may comprise a switchboard facility at a customer's premises, enabling incoming calls to be directed to a plurality of individual telephone handsets.

Where it is required to connect a new customer site to an existing communications network, or where it is required to set up a communications network in a locality from scratch (a "green field" network) the design of the new network, or the design of the modification to the network, is conventionally carried out by a human designer or a team of designers. Network design is a skilled activity that relies on human expertise. There are sections of networks which can be automatically designed, once the necessary design parameters or specifications for the network have been established. Particular sections of a network may be designed by existing algorithms and design techniques implemented by computer. Nevertheless, in general, human network designers tend to use such algorithms and techniques as tools in designing a network, and unless the human network designers can be convinced that the tools produce an optimum solution to the problem of network design, the human designers will generally rely upon their own experience and intuition in designing a network, rather than relying upon the algorithms to produce a design for a complete network.

The number and variety of parameters that the human network designer must take account of in designing a network is large. Some of the parameters familiar to human designers of telecommunications networks include selecting the type of switching network, for example packet switched network or circuit switched network (PSN or CSN), layout of network topology, availability, growth, survivability, reliability, delay, performance, cost, call blocking, grade of service, quality of service, hops, capacity, band width, and fixed alternative or dynamic alternative routing. Further, synchronous and asynchronous networks require different approaches to design optimization.

SUMMARY OF THE INVENTION

According to a first aspect of the present invention, there, is provided a method of processing data signals representing a plurality of networks, each network comprising a plurality of node equipment at nodes of the network, and connecting the node equipment a plurality of link, each comprising link equipment, said method comprising steps of generating a population of individual hierarchical signals, each describing a respective network; testing each hierarchical signal to check that it represents a viable network; testing each hierarchical signal which represents a viable network against one or more predetermined test parameters; selecting a set of said hierarchical signals depending upon a result of said step (c); evolving said set of selected hierarchical signals to produce a next generation population of hierarchical signals.

BRIEF DESCRIPTION OF THE DRAWINGS

The invention will now be described by way of example only with reference to the following drawings, of which.

DETAILED DESCRIPTION OF THE PREFERRED EMBODIMENTS

The invention will now be described by way of example only, with reference to the drawings identified above.

Figure 1:
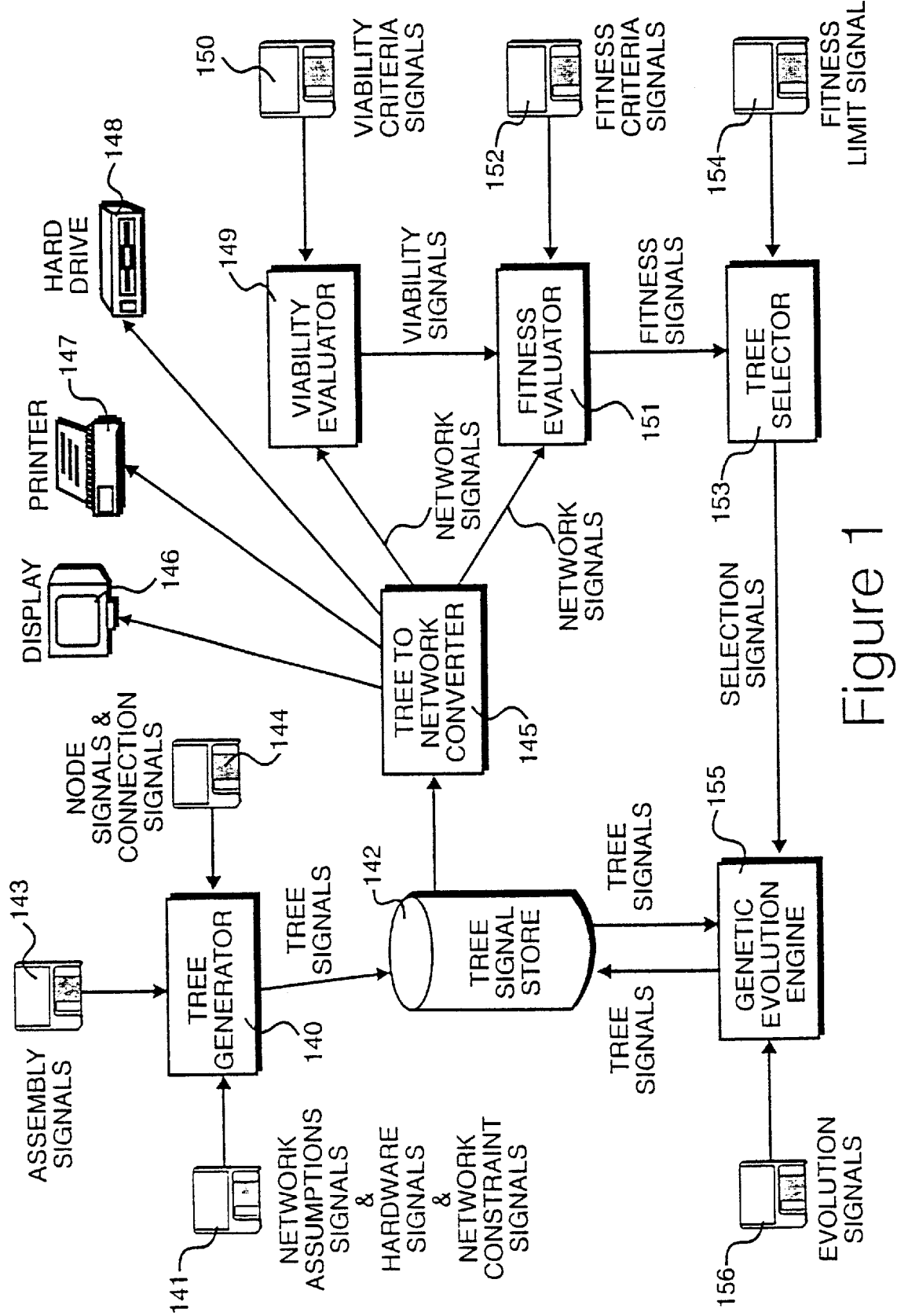
FIG. 1 shows a functional layout of hardware for implementing a preferred method according to the present invention.

A general overview for a network design apparatus is shown in FIG. 1, which utilizes a machine implemented genetic process for optimization of the network comprising nodes and links. A physical network is represented as a two dimensional network map comprising a plurality of nodes and a plurality of links. The network design apparatus may be used for arranging data signals defining a design of any network comprising node equipment and links equipment, eg a utilities services network such as a gas pipeline network, a road network, an airline network, an electricity supply network, a water distribution network or a communications network, for example a computer network or a telecommunications network. Hereinafter, by way of example the network design apparatus and its method of operation by arrangement of data signals will be described using the example of a communications network, and more particularly, a telecommunications network.

The network map comprises a comprehensive set of instructions for building a physical network. The nodes of the map represent pieces of physical node equipment and their locations. The links of the map represent physical telecommunications links, eg. in the case of a telecommunications network, fibre optic cables, microwave paths. The network map contains data representing the physical locations of nodes and links relative to one another, or relative to a predetermined geography, along with other characteristics relevant to the network, for example in the case where the network design apparatus is used to design a telecommunications network, the network map contains data representing routing tables, link and exchange capacities, service functions, and data describing costs or other performance criteria of hardware components. The network map may be stored in electronic form as a network signal in an electronic processor or memory.

The apparatus in FIG. 1 comprises a tree generator 140 which receives hardware signals representing data describing physical exchange apparatus, link apparatus, customer site equipment and other equipment of a telecommunications network, network assumption signals representing data concerning any initial assumptions about the type of network likely to be designed and network constraint signals representing any constraints on the network required. The tree generator 140 comprises a portion of electronic memory and an electronic processor. The hardware signals, network assumption signals and network constraint signals may be received by transfer from a signal carrier such as a floppy disk 141 to an electronic memory, assigned to the tree generator 140. The processor operates in accordance with a set of predetermined assembly signals, which may be input from a signal carder for example a floppy disk 143, in order to assemble the hardware signals into a hierarchical tree structure in which the hardware signals are encapsulated by node signals and connection signals, the connection signals connecting together the node signals.

The node signals and connection signals may be input to the tree generator via a signal carrying medium such as a floppy disk 144. Assembled tree signals are transmitted to a tree signal to network signal converter 145 which implements the instructions contained in the connection signals and node signals in order to create a set of network signals describing a physical telecommunications network. Each tree signal describing a respective hierarchical structure of hardware signals, node signals and connecting signals is converted into a respective network signal representing a single physical telecommunications network, by the tree to network converter 145. The network signal representing the physical telecommunications network comprises the network map in signal form. The tree generator may generate a large initial population of tree signals, for example 500, which are stored in the tree memory 142 and each tree signal is converted by the tree signal to network signal converter 145 into a respective network signal, resulting in a large population, for example 500, of network signals each defining a respective network map.

The tree to network converter 145 preferably comprises an electronic processor configured to implement the instructions contained in the node signals and the connection signals. From each network signal, can be derived a resulting visual network display representing the network map for display on a display device 146. The network signals may undergo further electronic processing in order to configure them to a format suitable for display on the visual display device 146. Alternatively, the network signals can be configured to produce hard copy representations of the network map represented by the network signals, to be printed out on a printer device 147. The network signals can be downloaded onto a signal carder, eg a floppy disk, by a suitable device such as a floppy disk drive 148. Network signals are transmitted from the tree signal to network signal converter 145 to a viability evaluator 149. The viability evaluator tests the network described by the network signals against predetermined viability criteria signals, which may be downloaded from a signal carrier, eg a floppy disk 150 into the viability evaluator.

Network signals which are within viability criteria defined by the viability criteria signals are transmitted to a fitness evaluator 151. The fitness evaluator evaluates the networks described by the network signals against fitness criteria conditions described by fitness criteria signals which may be downloaded from a signal carrier such as a floppy disk 152. The viability evaluator and the fitness evaluator may each comprise an electronic processor. The fitness evaluator outputs a fitness signal for each network signal operated on by the fitness evaluator. The fitness signal is transmitted to a tree selector 153, which preferably comprises an electronic processor. The tree selector 153 compares the fitness signals produced by the fitness evaluator with a set a predetermined fitness limit signals which may be downloaded from a signal carrier such as a floppy disk 154, and generates a selection signal for each network signal which has resulted in a viability signal and a fitness signal which fall within respective limits defined by the corresponding viability criteria signals and fitness limit signals.

The selection signals are input to a genetic evolution engine 155 which evolves selected tree signals transmitted from the tree memory 142, by combining and reproducing tree signals with each other, to produce modified tree signals which are then retransmitted to the tree signal store 142. The process of evolution of the tree signals is controlled by a set of instructions contained in evolution signals which may be downloaded to the genetic evolution engine via a signal carrier, eg a floppy disk 158. Preferably the genetic evolution engine 155 comprises an electronic processor with an associated portion of memory, eg RAM. Modified tree signals in the tree signal memory 142 are then sent to the tree signal to network signal converter 145, and the process as described above is repeated on the modified tree signals. This results in a new set of tree signals which are operated on by the genetic evolution engine 155. Each time a selected set of tree signals are operated on by the genetic evolution engine 155, a new generation of modified tree signals are overwritten into the tree signal memory 142. A number of generations may be selected, and for any generation, displays representing physical networks represented by the network signals corresponding to that generation of tree signals may be obtained on the visual display device 146, or the printer 147.

In a preferred embodiment, the tree generator, viability evaluator, fitness evaluator, tree selector and genetic evolution engine are implemented by configuring an electronic computer, for example by configuring a UNIX platform in the programming language C. Tree signals and/or network signals may be unloaded from the tree to network converter 145 by means of a hard disk drive 152.

Figure 2:
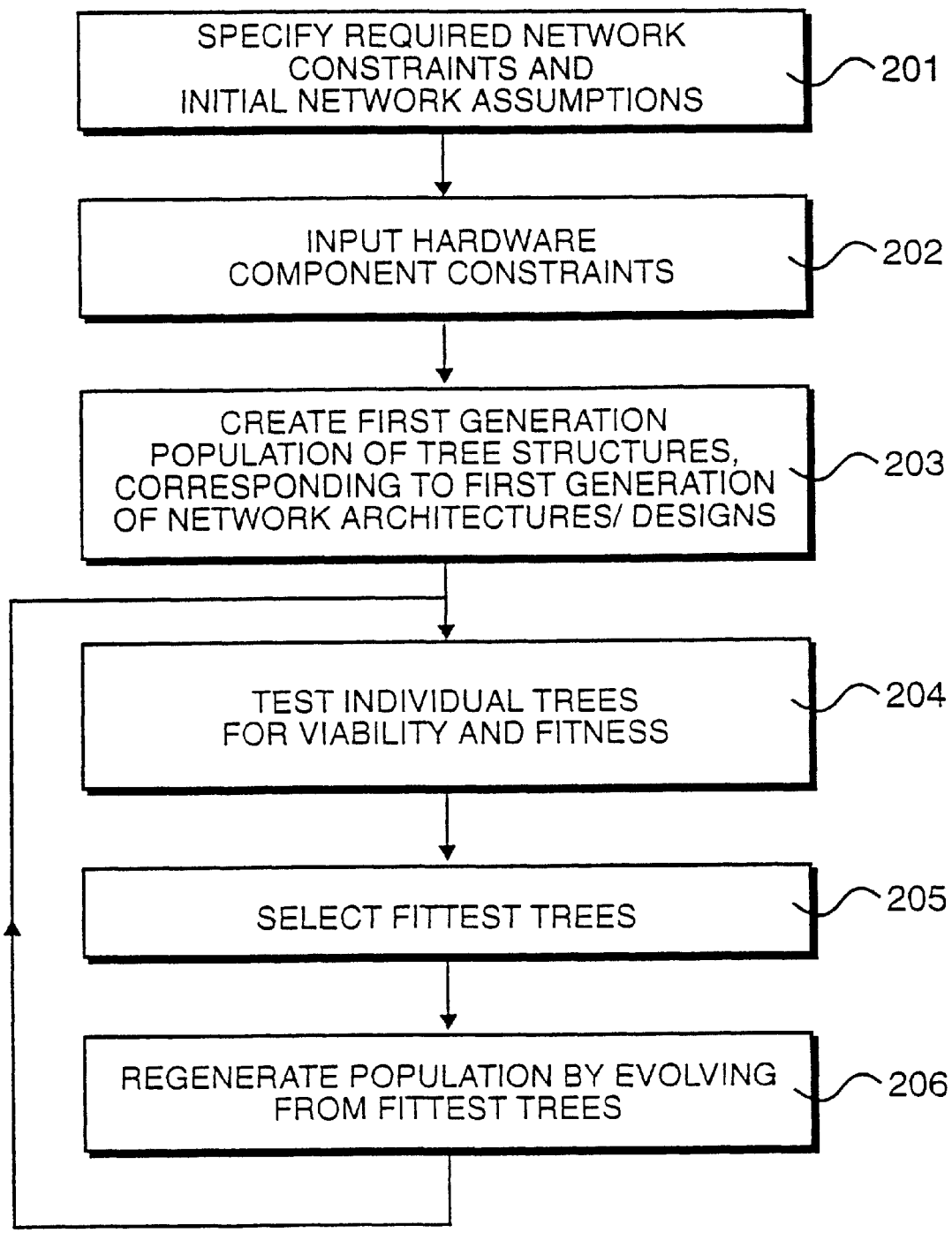
FIG. 2 shows a general overview of a preferred method according to the present invention.

Referring to FIG. 2 herein there is described a general overview of a process implemented by the apparatus of FIG. 1, for obtaining tree signals. Each tree signal is convertible into a set of network signals representing a design (the network map) for a respective telecommunications network. The result of the process is a set of signals representing designs for a telecommunications network. The signals may be used to, drive a display device or printer, in order to produce a hard copy network map for a telecommunications network. A physical telecommunications network may be built in accordance with the information contained in the network maps. Since the construction and operation of the telecommunications network is dictated by its overall design, as embodied by the tree signals, the process for designing the network is implicitly part of the physical telecommunications network itself. The tree signals resulting from the process described herein, dictate the operation and functioning of a physical telecommunications network.

At step 201 the commencement of the process comprises specifying a set of required constraints of the network, and making any initial assumptions about the type of network required eg the number and locations of exchanges. This step is implemented by creating data signals representing the network constraints and network assumptions. Step 201 may be thought of as defining a problem to which an optimized solution is to be found.

At step 202, hardware signals representing the physical constraints of individual hardware components which are available for inclusion in the physical network is collected. Such data signals may be available as data signals stored in a database on a computer, or may be input from a signal carrier, eg floppy disk 141.

At step 203, an initial population of hierarchical two dimensional tree structure signals are generated. Each tree structure signal represents data which specifies a particular network design as a possible solution to the problem of obtaining an optimum network design within the specified constraints. Typically a population of individual tree signals of size sufficient to give a wide variety of solutions is generated, for example 500 tree signals, although the exact number could vary within wide limits of this figure. The tree signals are generated by a random or part random process, in accordance with a set of assembly instructions which assemble node signals, connecting signals and constraint signals into a two dimensional tree signal.

At step 204, each individual tree structure is converted to 2 respective network signal, which is tested for viability and for fitness as a network design. Each network signal is tested in respect of the viability of the physical telecommunications network which it represents. Since the trees are initially randomly generated, not all trees will result in network signals which describe designs which are physically viable.

Fitness testing comprises testing a network design represented as a network signal resulting from an individual tree against a defined fitness criteria, for example performance, reliability, resilience or cost. Each individual tree signal is accorded a measure of its fitness.

A predetermined percentage of the tree signals of the initial population are selected at step 205 to form the base from which a next generation population of tree signals will evolve. Since the majority of the least fit trees are unlikely to be selected as the basis of the next population, the number of selected tree signals will be lower than the number of the tree signals in the initial population.

At step 206, the population is regenerated by evolving new tree signals from the selected viable tree signals of the initial population. Regeneration of the tree signals may be through the mechanisms of crossover, reproduction in unchanged form, mutation, or permutation.

The number of individual tree signals in the regenerated population will be, larger than the number of tree signals selected, due to some tree signals having more than one offspring. The number of tree signals in the regenerated population may be brought up to match the number of tree signals in the original population. The regenerated population then undergoes further viability and fitness testing at stop 204 and further selection and regeneration at steps 205 and 206.

The selection of tree signals is made by assigning a probability of selection to each individual tree signal, the probability determined by the fitness accorded to each tree signal as a result of the fitness testing. The fitter tree signals are more likely to be selected than the less fit tree signals. By the process of selection of the tree signals based on their fitness score, it can be expected that the average fitness of each population increases with time. Further, individual viable tree signals having outstanding fitness may appear in some generations, representing an optimal network design.

Steps 204, 205 and 206 are repeated until a predetermined number of generations have evolved, or a predetermined time has elapsed since creation of the initial population, or until further regeneration of the population produces little or no increase in average fitness, or if an individual tree signal or individual set of tree signals evolves having a fitness upon which it is difficult to improve.

Figure 3:
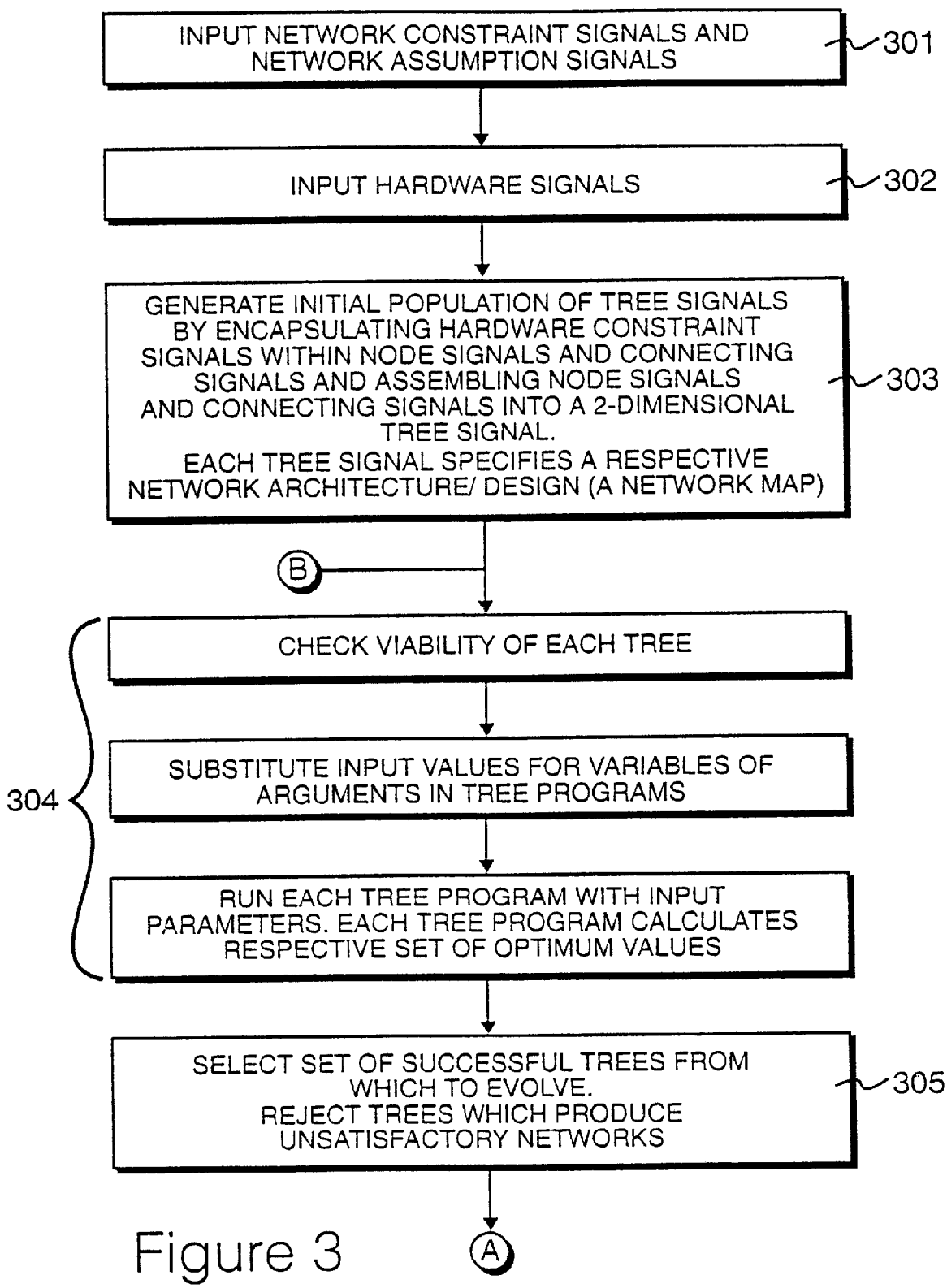
FIG. 3 and FIG. 4 show schematically further detail of a preferred method according to the present invention.

Referring to FIG. 3 of the accompanying drawings, a specific preferred process, being an example of the general preferred process of FIG. 2 is described. At step 301 required network constraints and initial network assumptions are included as network constraint signals and network assumption signals. The constraint signals may describe required input parameter data signals and output parameter data signals to the network in order to define a specification for a network design.

At step 302 constraints of the network hardware components are specified by hardware signals.

At step 303, an initial population of tree signals is generated, each tree signal representing a respective network architecture or network design (ie a particular network map). Each tree signal is assembled by a processor in accordance with assembly instructions implemented by assembly signals, such that a set of the hardware signals representing hardware components are encapsulated in node signals and connecting signals. The node signals are linked together by the connecting signals into a two or more dimensional hierarchical structured tree signal. Each tree signal represents a set of instructions for operating a processor to produce a set of network signals which describe a physical communications network.

At step 304, the viability of a network design resulting from each tree signal is tested by comparing the network design resulting from the tree structure with a set of viability criteria signals. If the network is within those constraints, then the network is viable. If it is not inside those constraints then the network is not viable.

The fitness of each tree of the population is determined by converting the tree signal into a network signal representing a network design, and then by simulating the behaviour of that design under typical operating conditions, by processing the network signal in accordance with signals representing call traffic flow, call traffic bandwidth, call traffic routing, and other traffic which the network is expected to carry, or by calculating the cost of assembling a network of that design by summing signals representing the cost of individual components represented by the network signal. The behaviour of the design is simulated by processing the network signal along with signals representing input parameter values to produce resultant signals representing respective sets of values for performance, reliability, resilience and cost.

At step 305, successful trees are selected from which to evolve. Tree signals which produce unsatisfactory networks are rejected.

Figure 4:
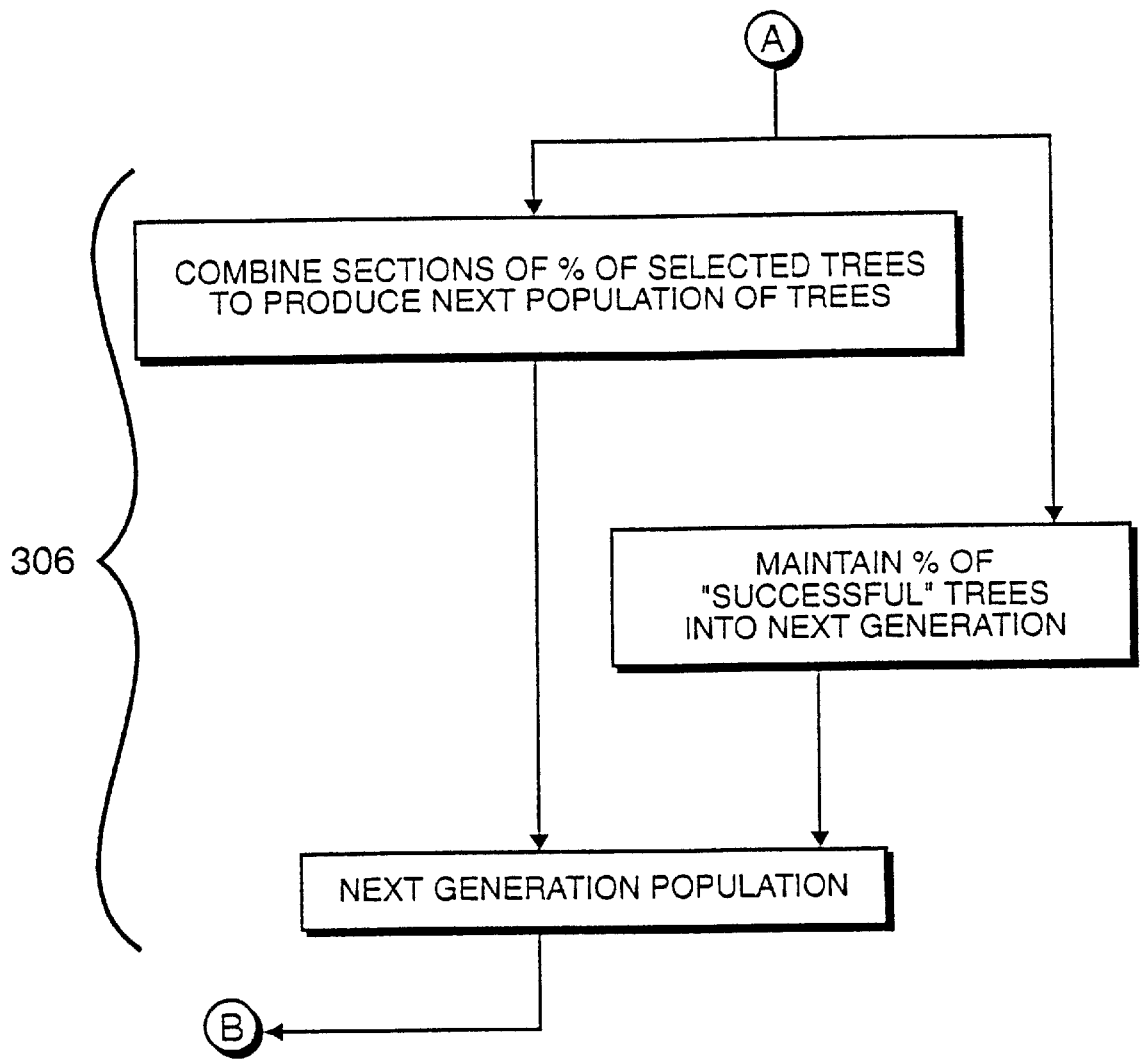

At step 306 (FIG. 4), regeneration of the population is made by combining sections of a proportion of the selected trees to produce a next population of trees, and by maintaining a percentage of the successful trees into the next generation.

Further variations and modifications of the processes of FIGS. 2 and 3 as implemented by the apparatus of FIG. 1 will be described below. Network constraints and initial assumptions about the network In order to define a network design problem for which an optimized solution is to be found, there need to be defined certain constraining parameters about the network which must be met for the network to be a viable solution to the problem. For example, if a problem is to design a network connecting four customer locations, then network designs which connect only three of the four locations will not be viable networks. The condition of connecting all four locations is a constraint on the network to be designed. Another example of a constraint may be a cost constraint. If a network has a limited cost budget, then to be viable any network designs must be capable of being implemented for a cost lower than the cost budget. Networks which have a cost higher than the cost budget, will not be viable, designs from the point of view of cost. Network constraints are entered into the process by means of entering network constraint signals into an electronic memory.

Examples of network constraints which may be termed is "viability constraints" are as follows:

all customer sites are connected.

average cumulative delay time along all possible routes is below a specified limit.

a maximum number of hops per route is less than a selected number.

an average value of the link capacity ratio is within selected limits.

the overall cost of the network is within selected limits.

reliability or survivability of the network is within selected limits.

all exchanges of the design have the necessary switching and concentration capacity to cope with the traffic on the attached links.

any initial assumptions about the network are met, eg all of the external exchanges included in an initial assumption are included in the network.

Viability constraints may be entered into the process in steps A or D as a set of viability constraint signals. In order to provide a population of tree structured signals which represent networks which are likely to fulfil the viability criteria, initial assumptions about the type of network architecture that will form a solution to the problem may be made prior to creating a generation of tree structures. For example, a minimum number of exchanges may be assumed, a minimum capacity exchange may be assumed or a minimum number of links may be assumed. The initial network assumptions and network constraints are input as network assumptions signals and network constraint signals to the tree generator 140. The initial network constraints specified, and the network assumptions made define the environment of the optimization process, and reduce the search space in which the process searches for an optimum network.

Several basic types of network design optimization problems which arise, and which have a bearing on the initial assumptions and network constraints specified can be classified as follows:

1. LAL—local access loop design

If a network is to connect up hundreds of telecommunications users traffic source and sink nodes, then it is usually considered sensible to separately cluster together and interconnect a number of groups of those users into separate local access loops as a first stage of a design process. The separate local access loops themselves can then be connected together via access points at a second stage of the design process.

2. BBN—backbone network design

A backbone network can be designed by considering the "local loop" access points as separate traffic source and sink nodes each representing a group of telecommunications users, and connecting them together with higher capacity components.

3. NED—network expansion design

In the context of providing new telecommunications services to existing telecommunications customers, a network design problem is how to upgrade an existing telecommunications network, rather than to build a new telecommunications network from scratch.

4. SO—survivability optimization

Of particular relevance to a backbone network design, but also of relevance to other types of network, is the survivability of the network as a whole when a single node or link fails. When there is a failure of a single node or link, it is important that the rest of the network can continue to function without significant loss of traffic. The design of telecommunications networks which are capable of sustaining multiple failures without a catastrophic loss of performance is an important task in telecommunications network design.

5. STO—Steiner tree problem

In a new "green field" telecommunications network design, if there is already an existing network of source or sink (SS) nodes as well as links, then adding new exchange nodes to the existing network at different locations and optimizing the placement and type of these nodes as part of the overall network design is classified as the Steiner tree problem (STP).

6. CLP—concentrator location problem

In local access loop design, this is the problem of designing the network so as to minimize the cost of connecting a single access point to the nodes. It is also known as the multipoint line optimization problem (MPO).

7. FAP—frequency allocation problem

In mobile telecommunications networks comprising a number of fixed base stations and a number of mobile handsets, if adjacent base stations are allocated communications frequencies which interfere with one another then the viability of the network is compromised. The frequency allocation problem (FAP) is to allocate frequencies to base stations in a mobile network, so that interference between base stations is minimized, and so that the number of different frequencies used is minimized.

8. RTO—routing table optimization

A routing table contains an address specific sequence of preferred paths through a network for received traffic. It is possible to operate a given network most efficiently by optimally choosing the routes, whether these be fixed or dynamically allocated. A higher overall level of utilization can be achieved by optimizing the choice of routes. The problem is called the routing table optimization problem (RTO).

9. BA—bandwidth allocation

The problem of allocating bandwidth to a link between exchanges is analogous to dimensioning the links. The greater the bandwidth allocated to a particular link, the higher the capacity available to carry traffic on that link. The optimization of bandwidth allocation is connected with routing table optimization.

10. SCA—spare capacity assignment

Within a resilient network, capable of surviving cases of link or node failure, there will be spare capacity. Assignment of spare capacity within the network so as to limit the cost of that spare capacity and to restrict the hop limit in the restoration route is an optimization problem in network design. Spare capacity assignment (SCA) is a hybrid form of survivability optimization (SO) and routing table optimization (RTO).

The basic problem of all network design optimization is to produce a network design of least cost and best performance. In the context of network design, performance can be given different meanings. The starting point for the network can be a specification for a complete new network (green field network) having predetermined design parameters for traffic specification, Alternatively, the starting point for a network design can be an existing network, to which is to be applied a new traffic specification.

Network Hardware component characteristics

Any telecommunications network design must specify available components in order to physically construct the finished telecommunications network. Physical hardware components introduce their own constraints in terms of cost, performance, reliability, capacity, the types of telecommunications services which the components support, and the delay which the hardware introduces. These are examples of some of the characteristics of actual hardware devices.

Details of hardware component performance and cost are input as hardware signals comprising data signal matrices. A hardware component may be described in terms of a data signal matrix at an argument, either internal or external, of a tree structure.

Representation of a network as a tree structure

When applying genetic procedures to telecommunications network design, there is a problem of how to represent a physical network as a tree structure before techniques can be applied to the task of designing a network architecture.

Real telecommunications networks consist of a plurality of nodes at which are sited customer equipment, or exchanges, and physical links connecting the nodes. The physical link may be a cable link, or can be a microwave link or the like. Each piece of node or link equipment will have physical performance characteristics and limitations on speed, data capacity, switching capacity and the like, as well as having operating cost and purchase cost characteristics associated with it.

In a preferred process of the present invention, a tree structure is used to describe a network architecture as follows:

TREE COMPONENTS

A tree structure of signals for representing a telecommunications network is made up of connecting signals and node signals, the connecting signals connecting the node signals in an hierarchical structure. The connecting signals comprise:

one or more link signals which create links between nodes of a network map; and one of more graft signals which create links between nodes of a network map.

A plurality of node signals, describe physical exchanges, physical links or customer sites.

The link and graft signals appear at the root or at internal arguments of the tree, and the nodes appear at external arguments (the "leaves") of the tree. A hierarchial tree structure is constructed from a plurality of link, graft and node signals. The link and graft signals act as connecting signals for connecting the node signals into tree signals. Some connecting signals are more important in the hierarchical structure than other connecting signals. At outer levels of the structure, each connecting signal connects a pair of node signals. At inner levels of the structure, each connecting signal connects a sub tree with a node signal or another connecting signal, with each sub tree comprising one or more connecting signals and a plurality of node signals. In the hierarchy, some signals have greater connectivity than others in terms of the number of other signals with which they connect.

Physical equipment, eg exchange equipment, cable or transmission link equipment may be described in terms of matrices of hardware signals. The link, graft and node signals may operate on these hardware signals by specifying arrangements of hardware, eg in terms of specifying the location of hardware components, geographically, the number and type of transmission links or exchanges or customer sites, and how they are connected to each other.

The link signals are used to describe information about physical cable link equipment, and their connection pattern to node equipment. The graft signal is used to denote the joining of physical links or sub-networks at a node equipment, eg an exchange, and the node signals are used to describe node equipment, such as customer site equipment or exchange equipment. The node signal can also be used to describe an existing physical link.

LINK SIGNALS

Figure 5:
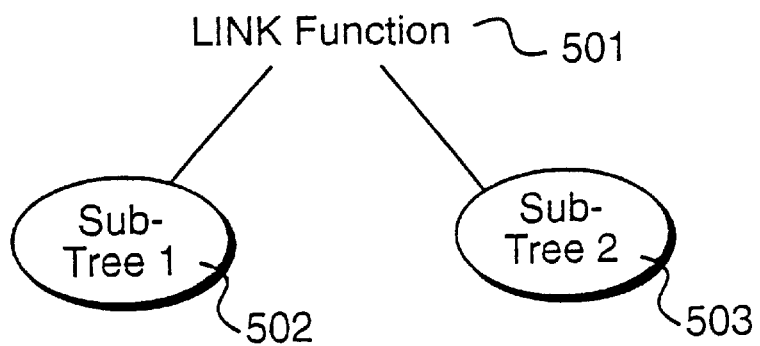
FIG. 5 shows a configuration of a link signal comprising the preferred method.

Referring to FIG. 5 of the accompanying drawings, a link signal 501 has left and right arguments 502, 503 respectively. Each argument comprises a separate tree signal, or a sub-tree signal describing a separate physical network.

Figure 6:
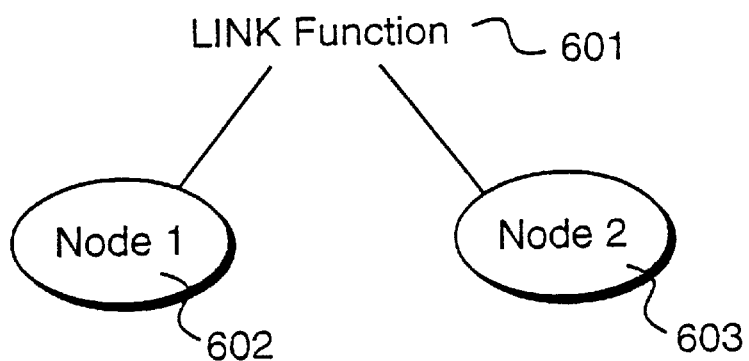
FIG. 6 shows another configuration of a link signal.
Figure 7:
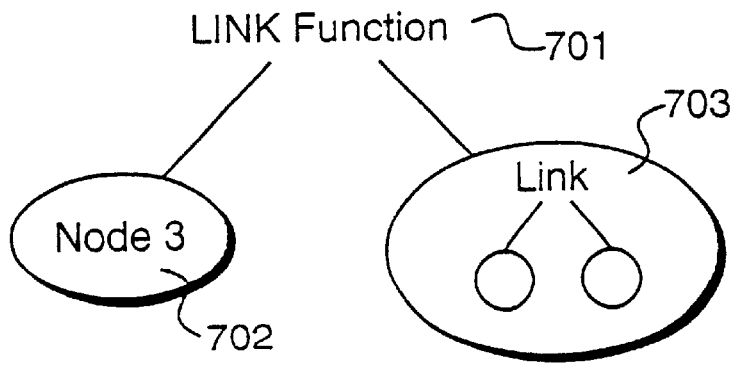
FIG. 7 shows yet another configuration of a link signal.

In general the arguments of the link signal can either be a node signal or another link signal, for example referring to FIG. 6, the link signal 601 has as its left argument node signal 1, 602 and as its right argument node signal 2, 603. In FIG. 7, link signal 701 has as its left argument 702 node signal 3, and as its right argument 703 a sub-tree beginning with another link signal 703. Link signal 703 in turn, has left and right arguments, each of which comprise a separate sub-tree signal.

GRAFT SIGNALS

Figure 8:
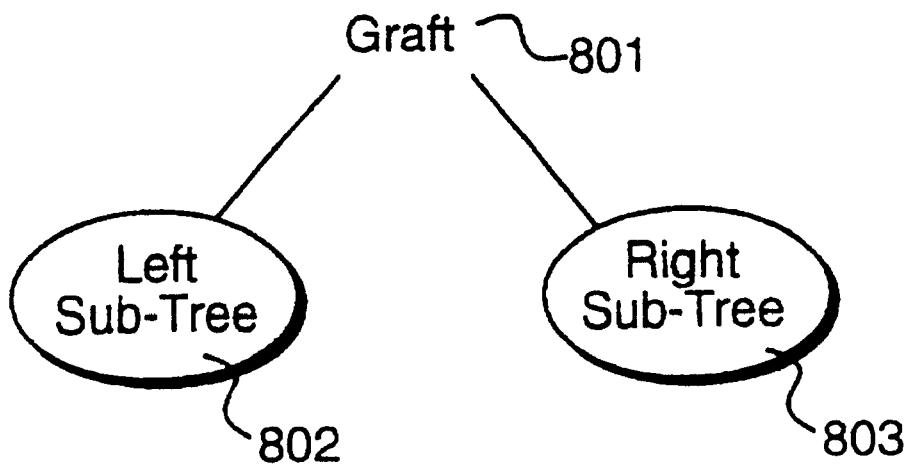
FIG. 8 shows a configuration of a graft signal according to the preferred method.

Referring to FIG. 8, a graft signal 801 has left and right arguments 802, 803 respectively, each of which comprises a separate sub-tree. Each separate sub-tree describes a sub-network of the overall network described by the tree. A graft signal with two arguments may join together at their nearest points, the two sub-networks comprising its arguments at an exchange, the exchange being represented by a node signal along the left argument of the graft signal.

Figure 9:
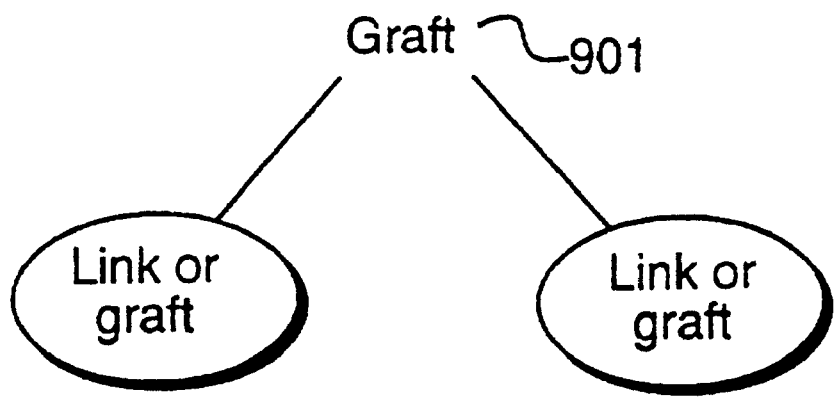
FIG. 9 shows another configuration of a graft signal.

Referring to FIG. 9, a graft signal 901 may have as its arguments as either a link signal or as another graft signal. The graft signal can have link signals as each of its arguments, or graft signals as each of its arguments, or a combination of a graft signals and a link signal as the arguments, as shown in FIG. 8 herein.

NODE SIGNALS

The tree includes node signals as the "leaves" of the tree structure. Node signals may represent any of the following:
1. a customer site
2. a new exchange
3. an existing exchange
4. an existing link The existing link could physically be a cable, a radio or microwave link or an optical fibre link. Information concerning the range of actual physical links available to the network designer and the actual exchanges available to the network designer and from which the physical network is to be constructed, are found as data signal matrices in the node signals and in the link signals.

For example, where a tree contains as a leaf an exchange node signal, the exchange node signal may comprise data signals concerning the physical location of the exchange, the capacity of the exchange to multiplex telephone signals, the capacity of the physical exchange to switch telephone signals, the delay rating per traffic volume of the physical exchange, a buffer size of the exchange, an initial cost of the exchange, an annual amortisation cost of the exchange, the running cost\annual maintenance cost of the exchange, the "pay as you use" leasing rate of the exchange and an indication of which services can be used at the exchange. The "pay as you use" leasing rate and the initial cost of the exchange can be represented as a cost per traffic unit, in the case of a leased exchange.

For example, where a tree structure is implemented by a computer in the programming language C, the information relating to the physical exchange may be represented as an array of data signals with several components. The data signals structure may be defined by customized C signals as follows:

.exchange$_{13}$ type="one"

physical location=.x and .y coordinates

The exchange_type in turn contains the following data signals:

.conc concentration capacity=the capacity of the exchange to concentrate signals .switch switching capacity=the capacity of the exchange to switch .delay effect the delay rating per traffic volume of the exchange .storage capacity the buffer size of the exchange .init_cost=the initial cost of the exchange .amort_cost=the annual amortisation cost of the exchange .maint cost running cost=the annual maintenance costs of the exchange .use_cost=pay as you use leasing rate of the exchange .service1=indicates which services can be used at the exchange ie services 1, 2, 3 etc Similarly, the link signals contain information concerning the physical cable links used to connect exchanges. In the programming language C, a link signal will identify a link by:

an identification .link_id the end locations of a link are given as exchange_ids.

.exchange1 and exchange 2 the length of a link is calculated automatically from the coordinates of the exchanges which it connects.

distance[exchange1 ][exchange2]

a type specifying the capacity and other features of the link is represented.

.link_type

The link_type data signals structure contains the following information:

.link_type="one"

.link_capacity=the maximum number of Kbytes per second which the physical link can carry .delay effect=the delay rating per traffic volume per distance of the physical link .init_cost=the initial cost per distance of the physical link .amort_cost=the annual amortisation cost per distance of the physical link .mint_cost the running cost or the annual maintenance costs of the physical link .use_cost=the "pay as you use" rate of the physical link .service1 is used to indicate which services can be used on the link, for example service1, service2, service3 etc.

The service1 signal can be used to incorporate varying costs, the cost varying according to the location of the link, if the cost information is included as a cost matrix.

OPERATION OF THE LINK AND GRAFT SIGNALS

A link signal causes a processor to inspect components of a tree signal stored in memory. The signal components of the tree signal may comprise node signals, link signals, and graft signals. The processor acts under control of the link signal as follows:

(i) firstly the link signal causes a search of the sub-tree in its first (left hand) argument, to search for a node signal. The sub-tree may be a single node signal, or may be a more extensive sub-tree having a plurality of node signals and one or more connecting signals.

(ii) having found a node signal in the left sub-tree of its first (left) argument, the link signal causes a search of the right sub-tree of its second (right) argument, for a different node signal to the one found in the left sub-tree. If the link signal happens to find the same node signal as found in the left sub-tree, the link signal keeps searching the right sub-tree until a different node signal is found.

(iii) having found a first node signal in the left sub-tree representing a first piece of physical equipment, and a second, different, node signal in the right sub-tree representing a second piece of equipment, the link signal checks to see whether there is an existing link between the two node signals found in the respective left and right sub-trees.

By "existing link" it is meant that if there are one or more connecting signals (either a link signal or graft signal) which represents a link between the two nodes on the network map represented by the node signals, the nodes representing physical pieces of equipment, then this is considered a link. If there is an existing link, then the link signal does nothing further.

If the link signal does not find an existing link between the two node signals, the link signal creates a new link between those node signals.

In this preferred process the link signal always searches in the order left to right for node signals. Link signals connecting the external arguments of the tree are considered first, before moving inwardly towards the root. Where an argument of the link signal comprises a sub-tree beginning with another lower link signal, the higher link signal will search the left argument of the lower link signal first.

(iv) if the link signal cannot find two different node signals in the respective left and right sub-trees, the link signal calls the graft signal, which then operates instead of the link signal on the same two arguments of the link signal. In this way, if the link signal cannot find two different node signals in the left and right trees, the link signal converts itself into a graft signal.

Figure 10:
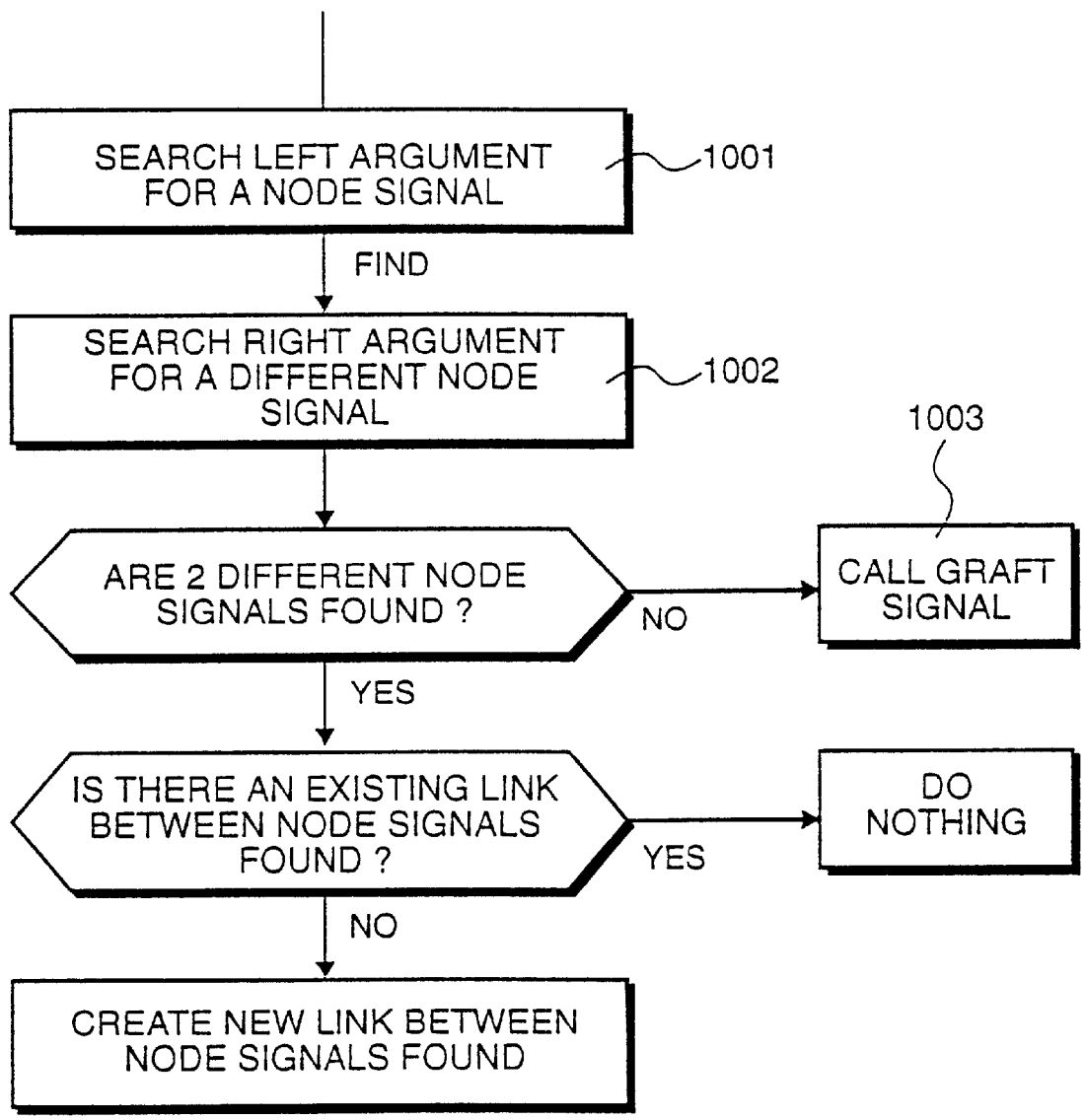
FIG. 10 shows schematically an operation of the link signal.

Operation of the link signal is summarised in FIG. 10 herein. The graft signal operates by causing a processor to inspect all the signals in its arguments stored in memory. The signals may comprise link signals, node signals and graft signals as follows.

At step 1001 the graft signal firstly produces a list of all the external arguments (leaves) in each of the two sub-trees in its left and right arguments. The external arguments will generally be node signals.

At step 1002 the graft signal also creates a complete list of all the internal arguments which it can find in the left and right sub-trees. The internal arguments will generally be link signals or graft signals.

If the graft signal finds any external arguments in the left sub-tree already linked to any external argument in its night sub-tree (if it finds that the two sub-trees are already linked) the graft signal causes no further action.

If the graft signal finds that there are no links between any external argument of the left sub-tree and any external argument of the right sub-tree, the graft signal identifies the two closest external node signals, one in the left sub-tree and one in the right sub-tree, relating to the physically closest customer site, exchanges or links and if the geographical distance (in substantially two-dimensional space in the represented network map between the closest node signals) is less than a predetermined amount, the graft signal joins the two external node signals by a link, at step 1003. In effect, the graft signal treats a physical network as two sub-networks of links and exchanges, each sub-network represented by a sub-tree. The graft signal then joins the two sub-networks of the network map representation (if they are not already joined) at their closest exchanges, by creating a new link between the closest exchanges.

If the closest geographical points of the left and right sub-trees are spaced apart from each other by more than the predetermined limit, then the graft signal creates an intermediate node signal between the two closest points of the left and right sub-trees. The intermediate node signal relates to a physical booster station at a node along a physical transmission link.

Figure 11:
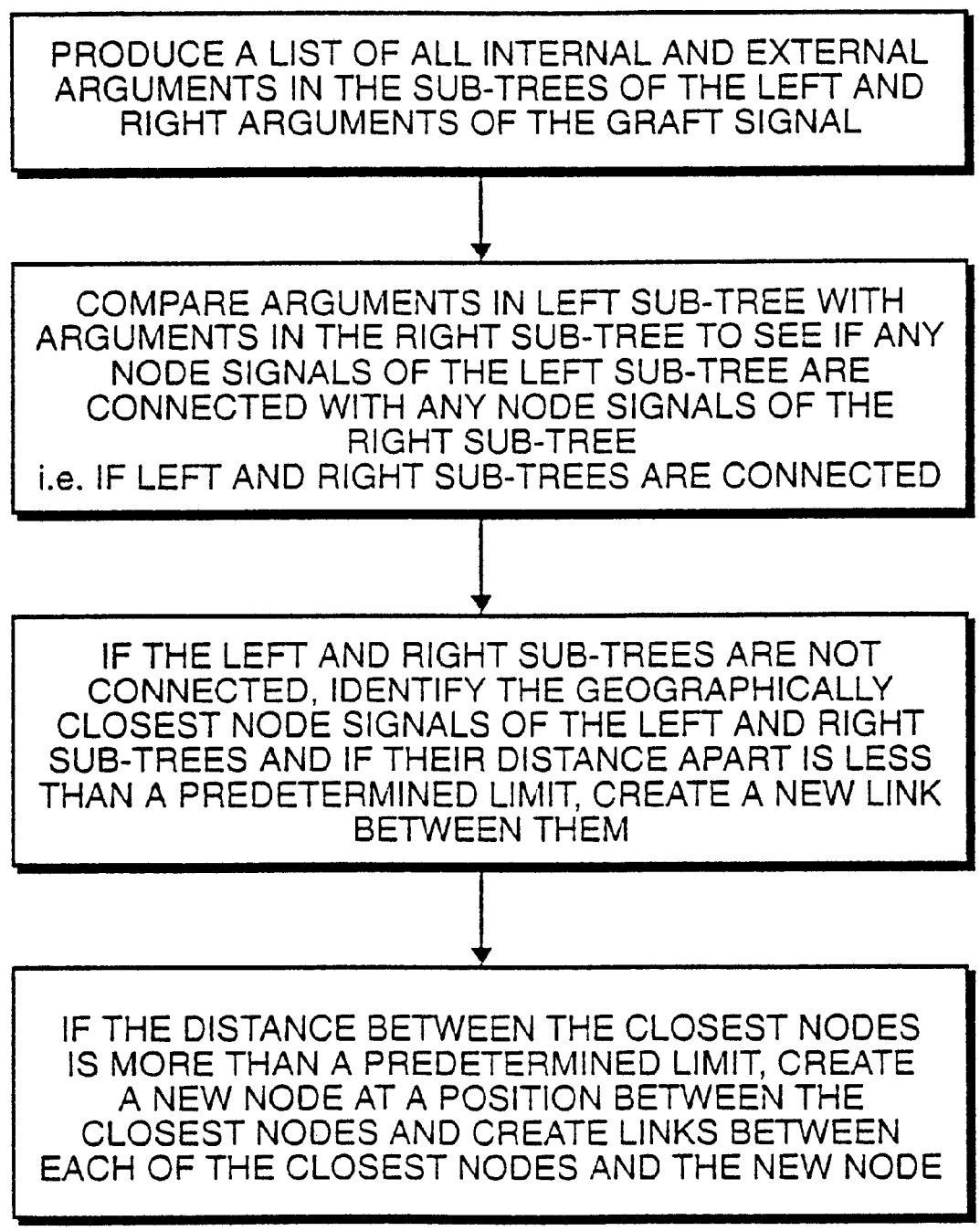
FIG. 11 shows schematically an operation of the graft signal.

Operation of the graft signal is summarized in FIG. 11. In deriving a network from a tree structure, the signals are considered in the order of outermost leaves first, and working towards the root of the tree. The link signals in the preferred process are considered left to right in the tree, and working from the leaves towards the root, in a hierarchical order of consideration for each main left or right sub-tree extending from the root.

EXAMPLE 1

Figure 12:
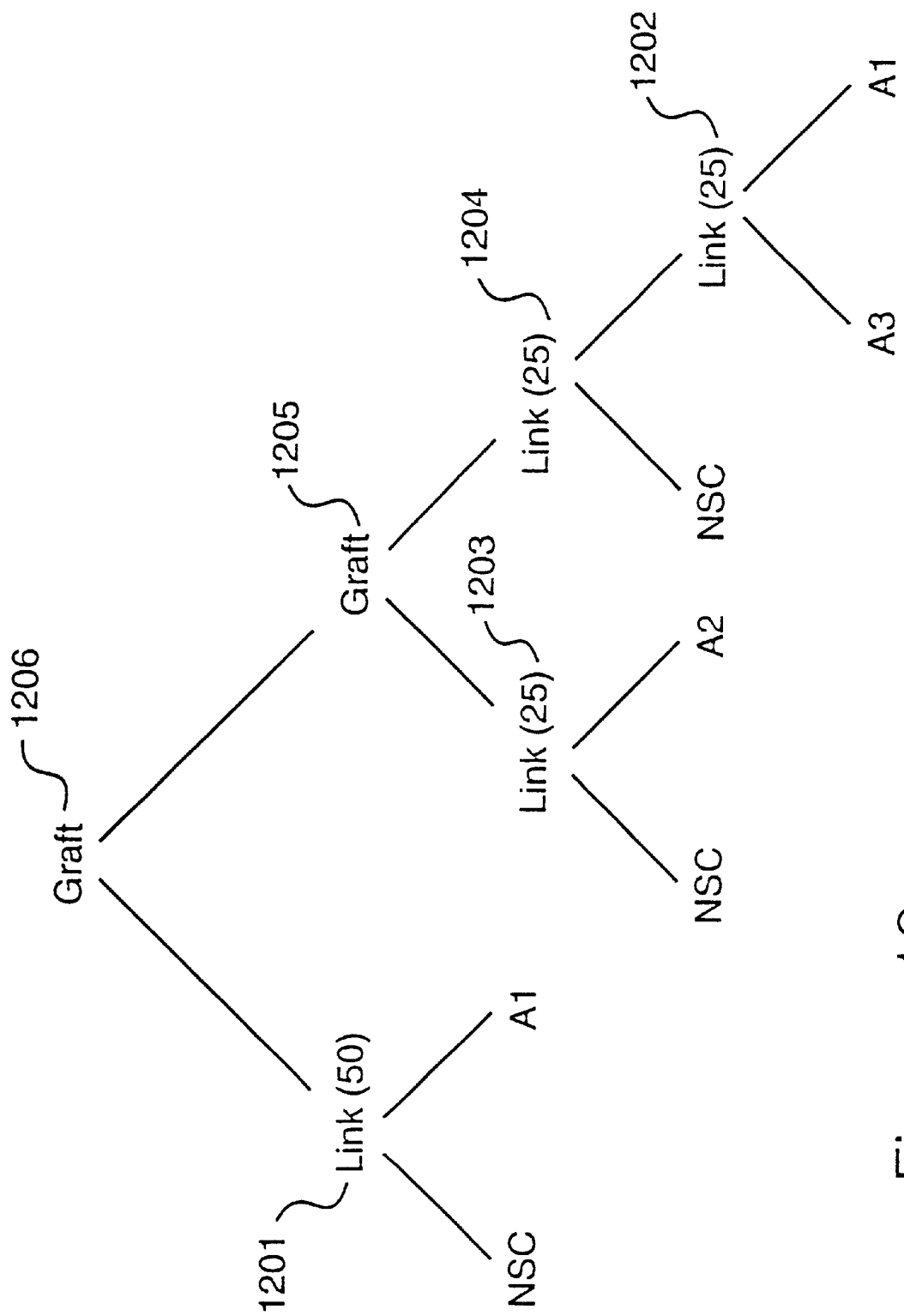
FIG. 12 shows a tree structure according to one embodiment of the present invention.

Referring to FIG. 12 of the accompanying drawings, operation of the link and graft signals will now be described. FIG. 12 shows a tree having four link signals two craft signals at internal arguments and at the root, and seven node signals at external arguments (leaves) of the tree In the tree there appear four exchanges A1, A2, A3 and NSC represented by exchange node signals. The link signals specify a number, which denotes one of the hardware constraints described above, for example a link capacity of either 25 or 50 kbytes per second.

Figure 13:
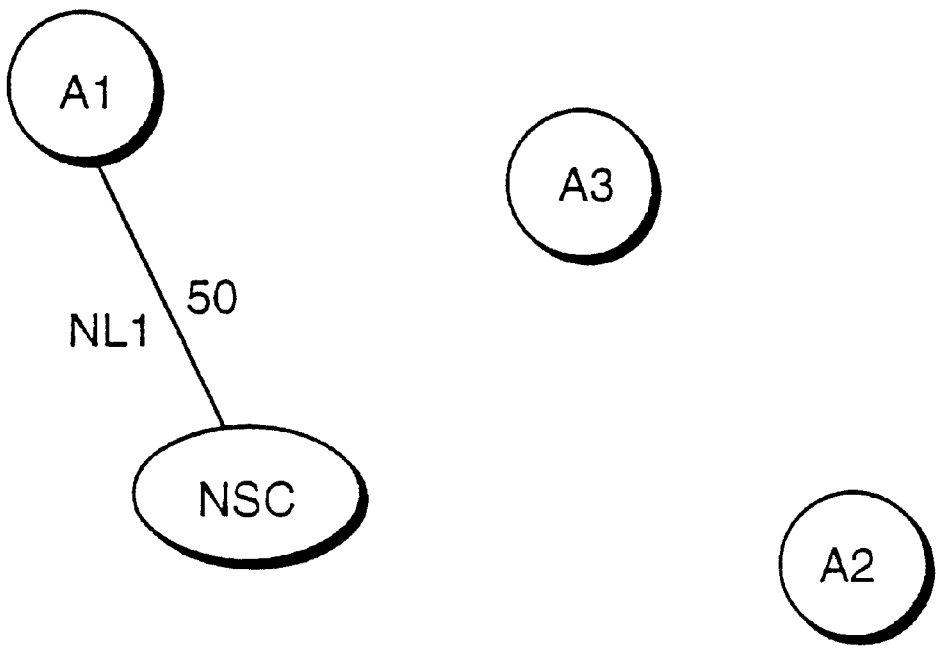
FIGS. 13 to 16 illustrate visual displays of a telecommunications network in accordance with the tree structure of FIG. 12, as displayed on a display device.

A first link signal 1201, denoted link (50), and representing a link having a capacity of 50 Kbytes per second, operates as follows. The first link signal 1201 searches the tree of its left argument for a node signal, and finds a node signal, representing exchange NSC. The first link signal then searches its right sub-tree comprising its right argument for a node signal, and finds the node signal, representing exchange A1. Since the node signals representing NSC and A1 are different, and there is no existing link between these nodes, the first link signal creates a link of capacity 50 Kbytes per second between exchanges NSC and A1. A display of the network map at this stage is shown in FIG. 13, with the creation of the new link NL1.

By creating a new link, it is meant that the link signal assigns a particular hardware signal corresponding to a physical link, to the node signals of the left and right arguments.

Figure 14:
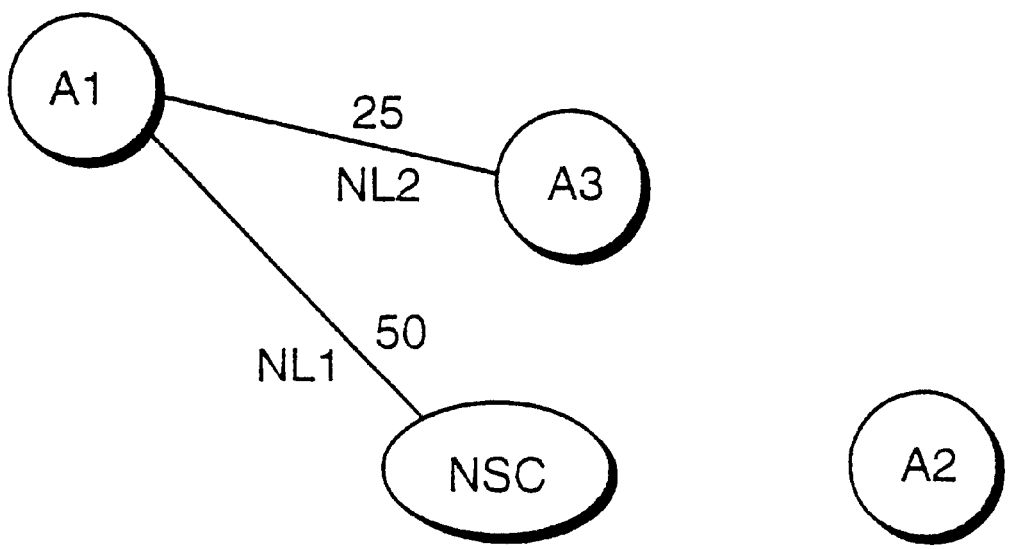

A second link signal 1202 denoted link (25) has as a left argument a node signal which represents the exchange A3, and as a right argument a node signal representing the exchange A1. The second link signal 1202 searches its left sub-tree (in this case just the exchange A3) to find a node signal, and finds the node signal of exchange A3. The link signal then searches the sub-tree comprising its right argument, in this case just the node signal representing exchange A1, to find a node signal and finds the node signal of exchange A1. Since the node signals representing A3 and A1 are different, the link signal creates a new link between them with capacity 25 Kbytes per second, since there is no existing link between the two exchanges A3 and A1. The portion of the network created by the second link signal 1202 is shown in FIG. 14 as the new link NL2.

Figure 15:
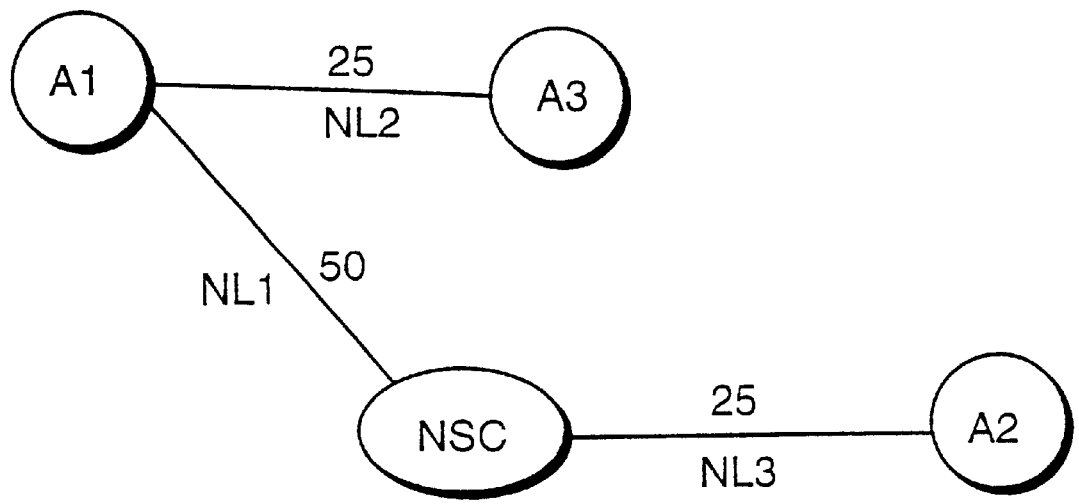

A third link signal 1203, denoting a link Of capacity 25 Kbytes per second firstly searches the sub-tree of its left argument, looking for a node signal and finds the node signal of exchange NSC. The third link signal then searches the right sub-tree of its right argument for another different node signal and finds the node signal of exchange A2. After checking that there is no existing link between exchanges NSC and A2, the third link signal creates a new link NL3 of capacity 25 Kbytes per second between exchange NSC and exchange A2. The corresponding position of the network representation is shown in FIG. 15, showing the new link NL3.

Figure 16:
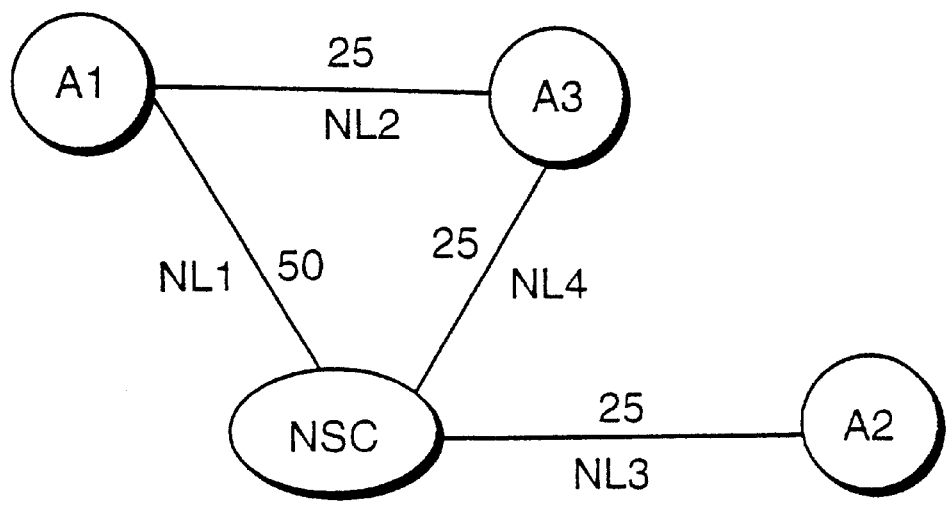
Figure 17:
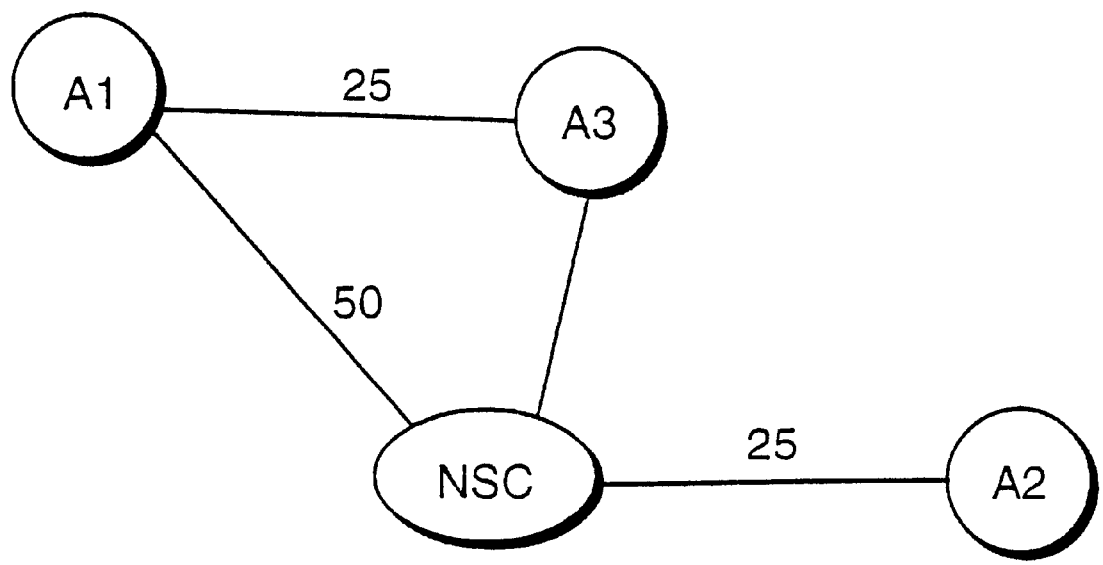
FIG. 17 shows a visual display of the network described by the tree structure of FIG. 12, as displayed on a display device.

A fourth link signal 1204 has as its left argument a sub-tree comprising a node signal of exchange NSC, and as its right argument a sub-tree Comprising the second link 1202 together with its respective left and right arguments comprising the node signal of, exchange A3 and exchange A1. The fourth link signal 1204 firstly searches its left sub-tree, comprising its left argument, for a node signal, and finds the node signal of exchange NSC. The fourth link signal then searches its right argument and finds node signals of exchange A3 and exchange A1. Since there is no existing link between the node signals found in the left and right arguments of the fourth link signal, the fourth link signal creates a new link NL4 with a capacity of 25 Kbytes per second between the exchanges NSC and A3. The position is shown in FIG. 16 as new link NL4.

Operation of the link and node signals has defined the number and type of exchanges and the physical links between them. These are represented as sub-trees. However, the sub-trees are not connected into an overall tree structure having a single root. This is achieved by the graft signal.

A first graft signal 1205 has as a left argument a left sub-tree comprising the third link signal 1203 and its arguments, and as a right argument a right sub-tree comprising the second and fourth link signals and their arguments as described above.

The first graft signal 1205 produces a list of all the signals of the external and internal arguments of the sub-trees within its left and right arguments, as follows:

| Left Sub-Tree | Right Sub-Tree |
| --- | --- |
| 3rd link-link (25) | 4th link-link (25) |
| NSC | 2nd link-link (25) |
| A2 | NSC |
|  | A3 |
|  | A1 |

The first graft signal then searches for node signals in the left and right arguments, If the first graft signal finds a link between any external node signal in the left argument and any external node signal in the right argument, the graft signal does nothing. In this case, since the external node signal representing exchange NSC in the left argument is linked to the external node signal representing A3 (and A1) in the right argument the graft signal does nothing.

A second graft signal 209 makes a list of all the external arguments (leaves) and internal arguments in each of its left and right sub-trees, producing the following list:

| Left sub-tree | Right sub-tree |
| --- | --- |
| 1st link-link (50) | 1st graft |
| NSC | 3rd link-link (25) |
| A1 | 4th link-link (25) |
|  | NSC |
|  | A2 |
|  | NSC |
|  | 2nd link-link (25) |
|  | A3 |
|  | A1 |

Since the second graft signal can find an existing link between a leaf in its left argument and a leaf in its right argument, the second graft signal does nothing. However, in this case, the presence of the graft signal has allowed the network to be represented as a tree structure.

The network map of FIG. 16 may be represented in the programming language C as follows:

```
graft(link50(NSC,A1),
    graft(
            link25(NSC,A2),
        link25(
            NSC,
            link25(A3,A1)
        )
    )
)
```

For the representation of the network as a tree structure, an initial population comprising a large number of tree structure signals, each representing a particular network are created. Creation of the tree structures is random, with link, graft or node signals being assigned randomly to internal and external arguments of a tree structure. As well as the random assignment of link, graft and node signals to internal and external arguments and to the root of the tree, the topology of the tree structure is itself created randomly with respect to number of levels from the root, number of external arguments and number of internal arguments in each of the left and right sub-trees of the tree structure. However, to reduce the search-space of the process, the tree structures may be generated to incorporate all the initial assumptions, eg node signals representing existing exchanges and existing links.

The size of the randomly generated population may be pre-set. As each tree is created, it may be tested for viability against the viability criteria. Since the aim of the first population is to create a population of viable tree structures, randomly generated trees which fail the viability criteria are not included in the initial population. Trees are created randomly and tested for viability, until enough viable trees have been created to provide a sufficiently large first generation population. The number of individual trees comprising the first generation population may be predefined, although the effectiveness of the process may be compromised where a restrictively low number of individual trees are specified as comprising the first generation population.
Viability and fitness testing In order for a tree structure to be selected as forming the basis for the next generation population, each tree structure must fulfil the requirements of:

1. viability; and
2. "fitness"

Viability could be broadly described as an absolute test of whether the tree describes a network map which represents a physical network which will actually work, within preselected limits of viability criteria, whilst fitness can be broadly described as how well a physical network obtained by an individual tree fulfils the goals of performance, reliability, cost or any other goals which may be set as a fitness test for the network.

The initial test of viability filters out trees which lead to practically unworkable networks. In a simple example, the viability criteria for a network may be simply whether all the customer sites are connected up. A trig describing a network in which customer sites are connected up will be viable. A tree structure which describes a network in which one or more customer sites are unconnected would be unviable and would be rejected.

Whereas in a preferred process, viability is an absolute test for rejection of a tree, fitness is a relative test for rejection or acceptance of a tree for forming the basis for the next generation. For example in a set of unviable networks, some networks will have better performance, better reliability, better resilience and lower cost than others. These networks will be "fitter" than their contemporary trees of their generation. However, since all trees in the set are not viable, then all trees are rejected for forming the next generation.

A set of trees which are all viable in that they all represent workable networks could, in practice, turn out all to be "unfit" or have poor fitness, in that they are not optimal. For example where a tree includes a large number of unnecessary or redundant links, or unnecessary\redundant exchanges, in other words an over-engineered, overconnected network, although the network may adequately satisfy the performance requirements, having adequate capacity, low switching delays etc and although the network may be viable on technical viability criteria, and because of the redundancy of links and exchanges the network may be very reliable and survivable, on application of the cost criteria, the network may turn out to be very expensive due to the redundancy of links and exchanges. A fitter network in terms of cost, whilst achieving similar performance, resilience and reliability criteria may be achievable by further evolution of trees of that population through successive populations.

The criteria for viability and fitness can all be predetermined and preset within limits, allowing large flexibility of the preferred process in addressing a wide range of network designs.

In the above example of the trees representing initially over engineered networks, where the "fitness" test is to reduce set-up costs, and trees are selected for forming the next generation on the basis of lowest set-up cost, then subsequent populations of trees could be expected to have less redundancy of hardware components, since components have associated costs. The fittest networks will include fewer and fewer components, and at some stage the fittest trees of a generation will fail the viability test, due to lack of components and inability to meet the viability criteria of reliability, connectivity, capacity, etc. The optimized solutions will be the fittest trees representing the lowest cost networks which still pass the viability test.

The viability and fitness tests may be selected from the same set of parameters. Whether a parameter is used as a viability test or as a fitness test is different from case to case, but may be determined by whether the parameter is used as an absolute ground for rejection of a tree or a relative ground for rejection of a tree, judged relative to the same parameter of other contemporary trees.

Test parameters for viability include one of more of the following:
  the network must contain all of the external exchanges included in the initial network assumptions;
  exchanges must have the necessary switching and concentration capacity to cope with the traffic on the attached links;
  the network must meet predefined minimum standards in respect of one or more viability constraints as follows:
    average cumulative delay time along all possible routes
    maximum number of hope per route
    average value of the link capacity ratio
    acceptable overall cost of the network
    the meeting of predefined survivability or reliability criteria Test parameters which may form the basis of a fitness test include:
performance
reliability
resilience
cost Performance may be described by parameters of delay, percentage utilisation of the network, average number of hops, or percentage blocking.

Reliability may be characterized in terms of parameters of resilience\survivability, percentage blocking, and availability.

The cost parameters may be characterized by parameters of set-up cost, cost to run and use the network, or cost to run and own the network.

Fitness testing is performed by creating network signals representing the network from the tree signals, and testing that network data signals in relation to the selected test parameter(s). This is, in effect, a simulation of network performance by modelling the network through its data signals, and testing that data signals by integration with other signals representing the test parameters.

One aspect of performance is the average delay experienced in transferring information. Another aspect of performance is the probability of failure in transferring information, known the blocking or percentage of lost calls. Additionally, reliability can appear as a separate constraint in the network design optimization problem, either as a fixed constraint, or as part or all of the goal of, the optimization. In the latter case, the network design optimization problem becomes a survivability optimization when applied to a backbone network. Reliability can be defined as the percentage of lost calls, or it can be seen as a different measure, more appropriately called survivability.

Survivability is a measure of the network's ability to survive the failure of individual links or nodes without losing its ability to transfer information. For a network to be survivable, there must be at least two separate routes between every pair of data signals sources\receivers which share neither nodes nor links with one another.

A basic problem of all network design optimization is to allocate equipment at nodes of the network and links between the nodes, having optimal characteristics and specification to produce an optimal network. The criteria for being an "optimal" network ie the fitness criteria, may vary from network to network. For example, where high reliability is required, and cost is of secondary importance, an optimal network will be a highly reliable network. On the other hand, where reliability is not as important as cost, then an optimal network will be a legs expensive network, albeit with reduced reliability.

It is possible to set minimum or maximum acceptable values for any of the fitness test parameters so that the optimization process will limit its search to designs which fall within these limits. These may be entered as fitness limit signals. Calculating the actual values for the goals for a particular network design usually requires data signals concerning source traffic, and data signals concerning the performance of a simulation exercise, in order to estimate the traffic at different parts of the network.

The test parameters of performance, reliability and cost may be described as network dependent attributes, because they are dependent upon the physical constraints of the network and its components. In addition to dependent network attributes, there are also other definable attributes of the network which at the outset are independent of the network, either because the network is an existing network, and the attributes can be added to the existing network, or because the network is a green field design.

Independent network attributes include the location of nodes, the location of links, the node capacities, the link capacities, the node abilities, the link abilities and the services available.

Node locations may be specified as being able to be placed anywhere, or at restricted sites, or at fixed sites, or it Come fixed sites, or at any SS node, or at only some SS nodes. This is implemented by inputting the locations as network constraint signals or network assumption signals. Link locations may be specified as being placable at any node, only at some nodes, being fixed, having some link locations fixed, being placed at any SS nodes, or being placed at only some SS nodes. Node capacities can be specified as of any capacity, of a discreet value, or being a fixed capacity, or only some being a fixed capacity.

Link capacities can be defined as being capable of adopting any capacity, of only discrete capacities, or of being a fixed capacity, or only some being a fixed capacity. Node abilities can be preset prior to optimization as allowing the node equipment to supply all services, only some of the services available, switching, and all concentration. The link abilities can be predetermined as being capable of supporting all services, only some services, switching, and all concentration. The services available may be single services or multiple services. Routing tables may be fixed, fixed by a rule, adopt any routing table, adopt any routing table with certain rules, or having only some routing fixed.

At the start of the network design, the basic problem can be stated as finding the best way to connect together a series of locations using existing or new exchange equipment and links, so as to achieve a required transport capacity between those locations within certain performance constraints, and at minimum cost. The above described variety of dependent network attributes and independent variable network attributes give rise to a vast number of possible variations. It is always be necessary to make some initial assumptions about the type of network required, in order to simplify the design possibilities.

In the preferred method herein, initial assumptions about the problem are defined initially. In the case of the preferred process described herein, initial assumptions about the network may be given in the form of input signals representing the number of nodes required, the physical location of the nodes, and the traffic volume through those nodes.

In the preferred process, implemented in the programming language C, the number of locations required may be specified by the function:

Identity=0
external_exchanges[n].exchange_id
The physical location of the nodes may be described by the function:
Physical location=x and y co-ordinates (or else a single number indicating a location in a raster scan of a specific area).
external_exchanges[n].x and y
The traffic volume may be specified in one of three forms:
Firstly as a traffic matrix, which equals the number of Kbytes per second required between each pair of external exchanges. In the case of the C implemented process, the function may take the form of:
format of matrix path_capacity[exchange1] [exchange2]
If this format is used then the exchanges(exchange1) matrix value is set to 0, otherwise it is set at 1.
Secondly, the number of users of each required service at each external exchange, and the total levels of outward traffic of these services at the exchange may be specified by the function:
exchanges[exchange1]users1 and exchanges[exchange1].alevelall
Thirdly, the total outward traffic level at the exchange may be specified by the C signal:
exchanges[exchange1].mlevelall
All traffic levels should be specified as two values, a maximum bit rate, and an average bit rate for continuous use over an 8 hour day. For example, as the function:
exchanges[exchange1].mlevel1 and .alevel1
The characteristics of the available exchange and link types also need to be specified using the parameters listed above.

Additionally, performance, location or cost constraints which apply to the desired network can be specified. In the C language, performance parameters can be specified by the function:
link_capacity,avemaxdelay,avenohops,storage_capacity.
Cost parameters may be specified in the C language as:
total_cost, fixed_cost, vary_cost.

Selection of fittest trees

Viable trees are selected on the basis of their "fitness" as measured by the selected test parameter applied to the network which the tree represents. Selection is in relation to other trees. The absolute number of selected trees, or the percentage of selected trees of the population may be set, or trees may be selected provided they achieve a predetermined fitness criteria.

The limits of fitness are input as fitness limit signals.

Evolution of tree populations

After testing each individual tree of the population for fitness, and selecting the most successful trees of the population to form the basis of the next generation, the selected trees are evolved to form a new population. Evolution of the selected trees to the new population may take the form of retaining the fittest tree structures forming a proportion of the selected trees, and carrying these forward in unmodified form into the next population. Other selected tree structures, forming another proportion of the selected trees, may undergo change by the mechanisms of crossover, mutation, or permutation.

Consider the problem of optimizing a new network connecting customer sites CS1, CS2, CS3 and CS4 to existing exchanges EX1, EX2 and EX3, where existing exchanges EX1, and EX2 are already connected by an existing link EL1. The customer sites, existing exchanges and the existing link can each be represented by node signal N1 to N8. The situation is shown in simplified form in the network map representation of FIG. 18.

CROSSOVER

Figure 18:
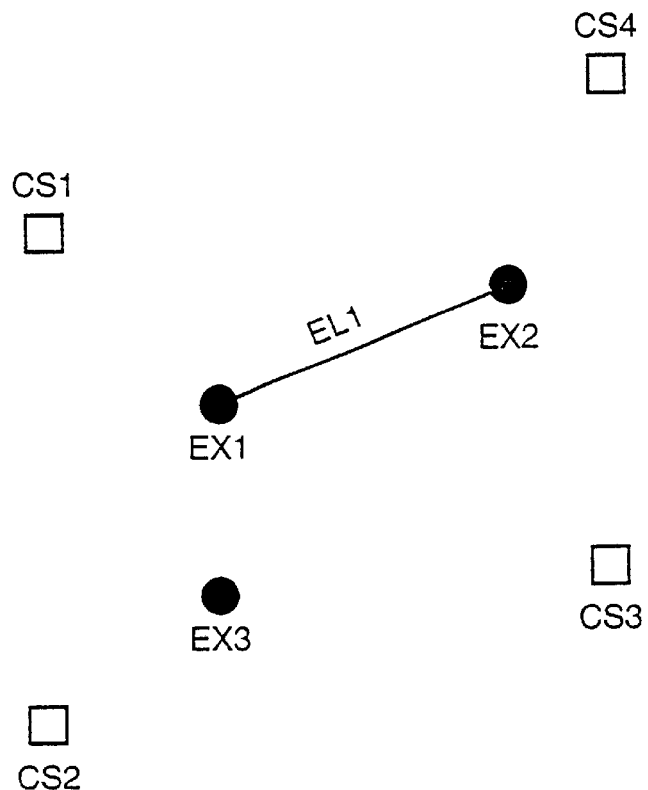
FIG. 18 illustrates a network design problem for linking a plurality of customer sites.
Figure 19:
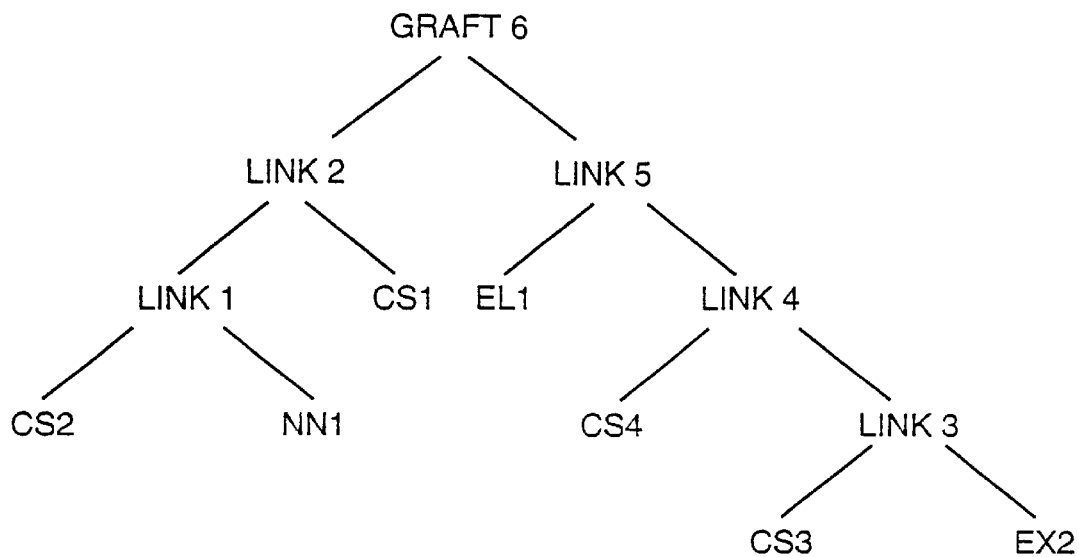
FIG. 19 shows a tree structure created to provide a possible solution to the network design problem of FIG. 18.

Referring to FIG. 18 of the accompanying drawings, there is shown a tree of an Nth population. The tree describes a network as illustrated in the network map of FIG. 19. A list of the corresponding node signals and link signals are shown below, for a new network constructed around exchanges EX1 EX2 and EX3 having an existing link EL1 between exchanges EX1 and EX2. The network in FIG. 18 includes intended customer sites CS1, CS2, CS3 and CS4.

| Node signals | Link signals |
|---|---|
| N1 = CS1 Customer site 1 | L1 = NL1 New link 1 |
| N2 = CS2 Customer site 2 | L2 = NL2 New link 2 |
| N3 = CS3 Customer site 3 | L3 = NL3 New link 3 |
| N4 = CS4 Customer site 4 | L4 = NL4 New link 4 |
| N5 = EX1 Exchange 1 | L5 = NL5 New link 5 |
| N6 = EX2 Exchange 2 | L6 = NL6 New link 6 |
| N7 = EX3 Exchange 3 | |
| N8 = NN1 New node 1 | |
| N9 = EL1 Existing Link 1 | |

The tree structure and corresponding network includes a new node NN1, to which a new link NL1 has been connected. The new node may have arisen through the random generation process of the initial population, or may have been randomly inserted during a mutation process of a previous generation. The existing link EL1, which forms an external argument to the tree (node signal N9) is interpreted as a reference to either of the two nodes signals of exchanges EX1, EX2, making up the two ends of the existing link. Incorporation of an existing link as an external argument improves the efficiency of the whole evolution process in this example. Node signal N9 in FIG. 18 operates differently to the other node signals, since it contains information about the existing link, and is treated as a reference to either of the two nodes making up the two ends of the existing link.

Figure 20:
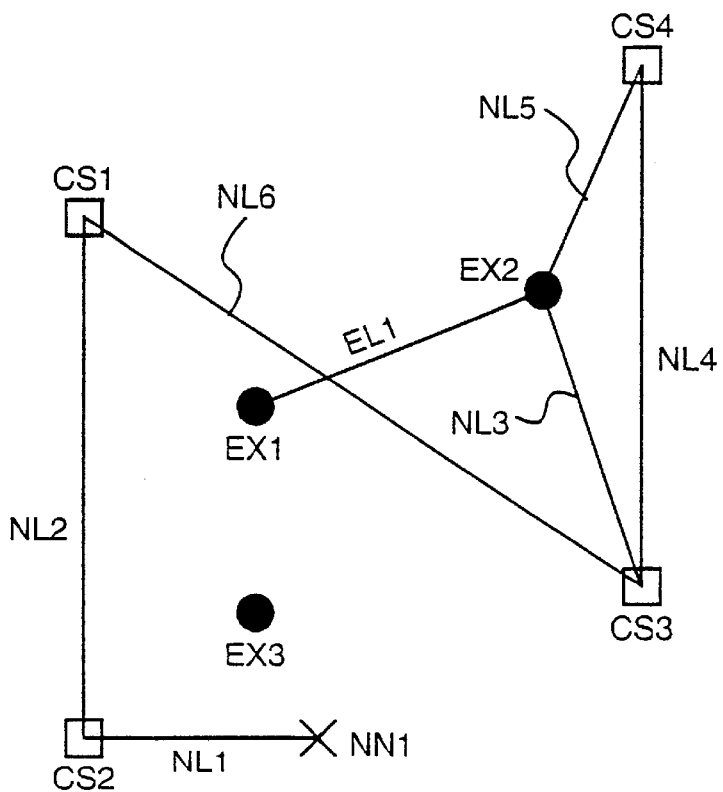
FIG. 20 illustrates a visual display on a display device of a network map representing a possible solution to the network design problem of FIG. 18 as described by the tree of FIG. 19.

Referring to FIG. 20 of the accompanying drawings, there is shown a second tree structure of the Nth generation. The second tree structure corresponds to a network having the same exchanges EX1, EX2, EX3 and customer sites CS1–CS4 as the network of FIG. 19. The network representation described by FIG. 20 is shown schematically in FIG. 21 herein.

Figure 21:
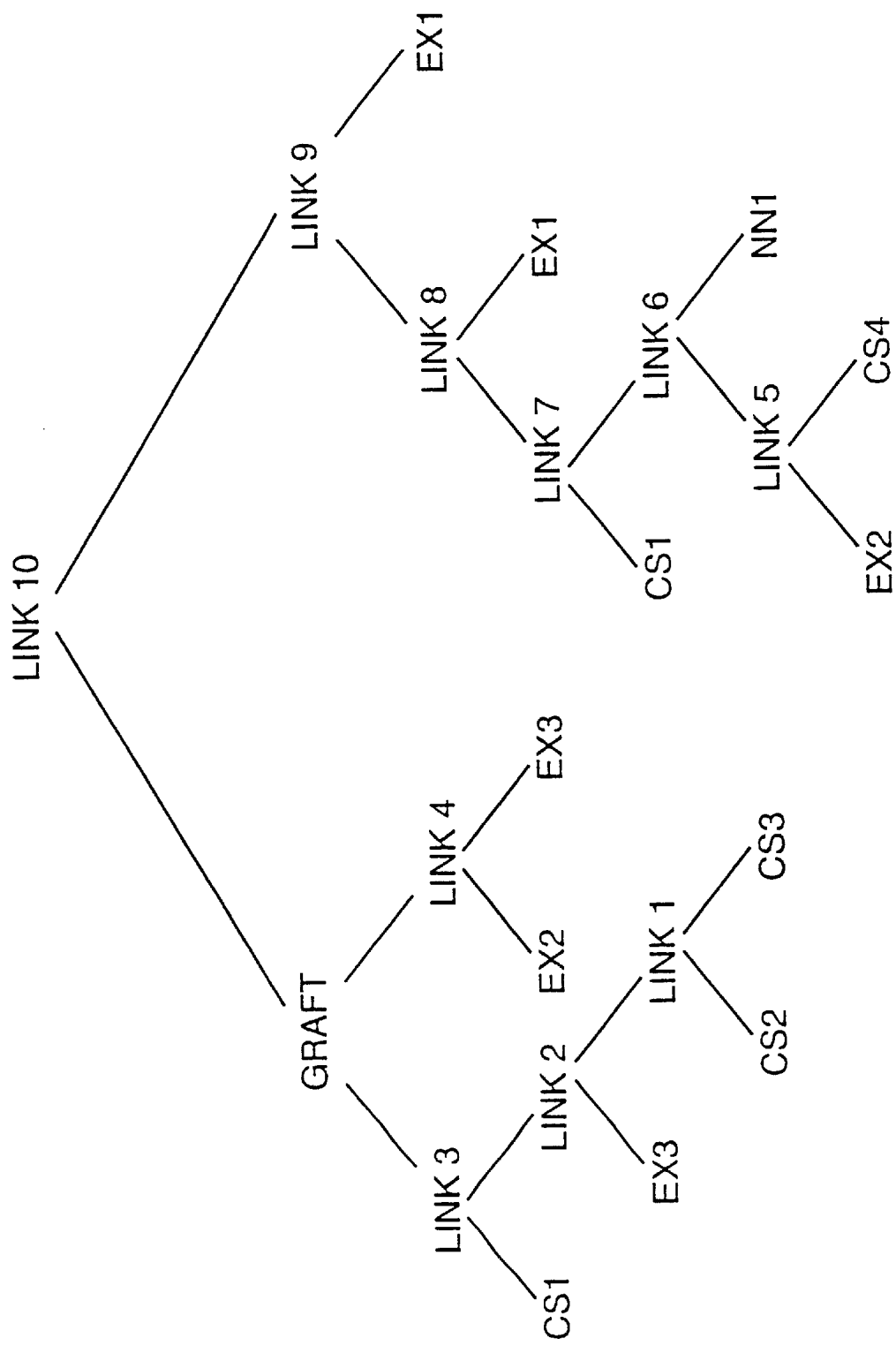
FIG. 21 shows another tree structure created to provide another possible solution to the network design problem of FIG. 18.
Figure 22:
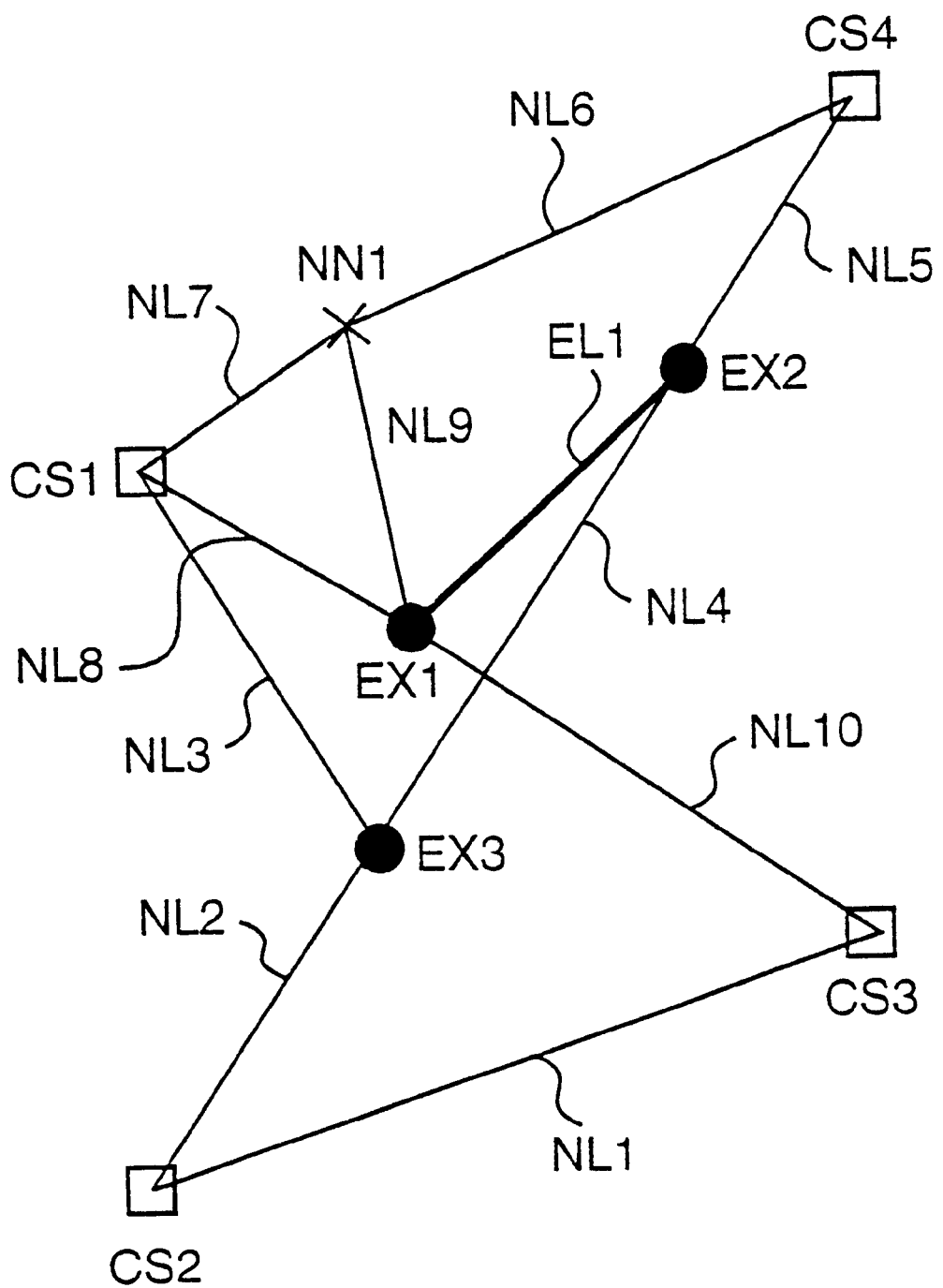
FIG. 22 shows a visual display on a display device of another network map representing a possible solution to the network design problem of FIG. 18 as described by the tree of FIG. 21.

The node signal and link signals of the tree of FIG. 20 and corresponding network of FIG. 21 are as follows:

| Node signals | Link signals |
|---|---|
| N1 = CS1 Customer site 1 | L1 = NL1 New link 1 |
| N2 = CS2 Customer site 2 | L2 = NL2 New link 2 |
| N3 = CS3 Customer site 3 | L3 = NL3 New link 3 |
| N4 = CS4 Customer site 4 | L4 = NL4 New link 4 |
| N5 = EX1 Exchange 1 | L5 = NL5 New link 5 |
| N6 = EX2 Exchange 2 | L6 = NL6 New link 6 |
| N7 = EX3 Exchange 3 | L7 = NL7 New link 7 |
| N8 = NN1 New node 1 | L8 = NL8 New link 8 |
| N9 = EL1 Existing Link 1 | L9 = NL9 New link 9 |
| | L10 = NL10 New link 10 |

New node 1 is a randomly generated new node.

Figure 23:
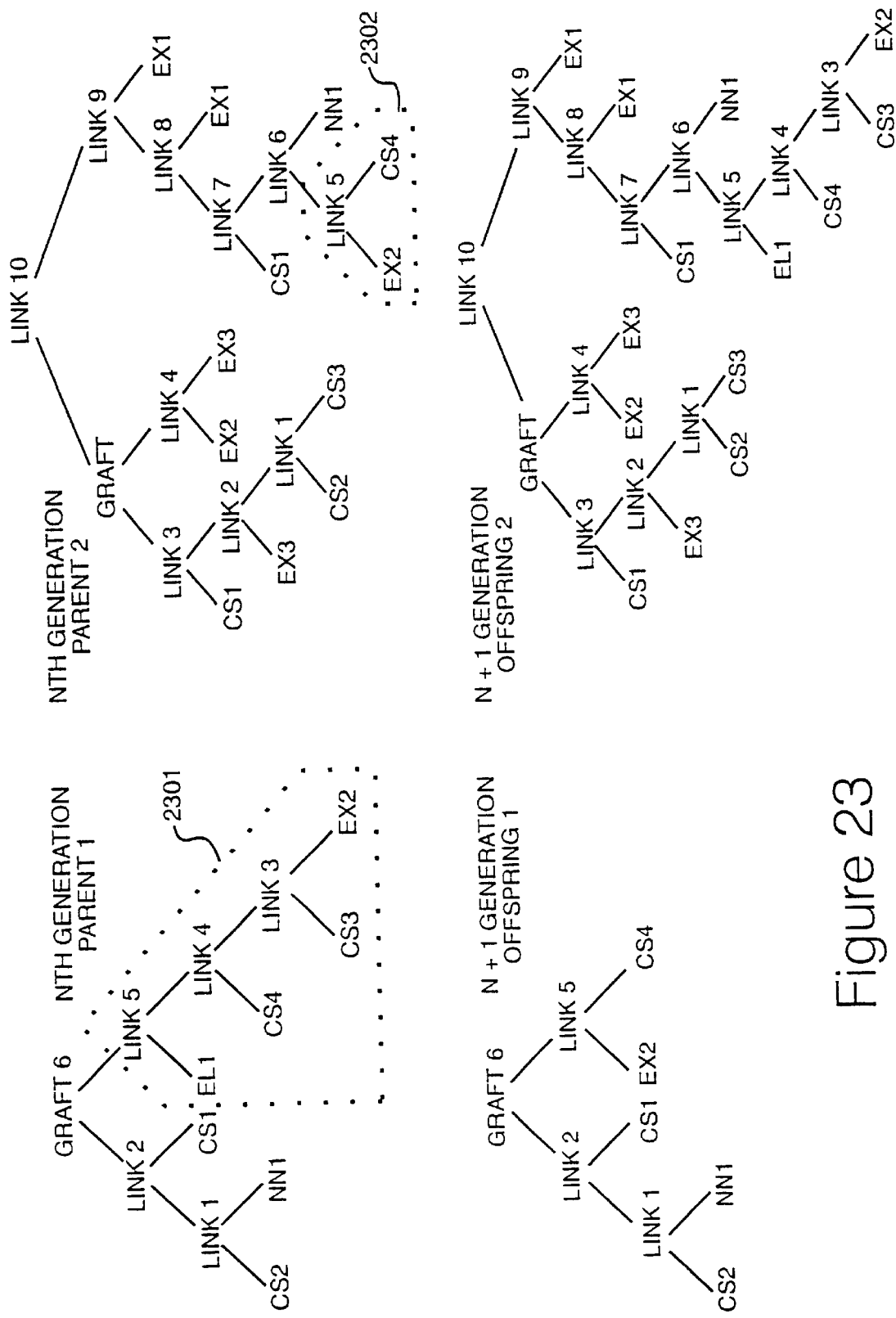
FIG. 23 shows evolution of the first and second tree structures of FIGS. 19 and 21, to create a further generation of offspring tree structures.

Referring to FIG. 23 herein there are shown the first and second trees of the Nth generation, denoted as parent 1 and parent 2. The first and second trees of the Nth generation are crossed over with each other to form offspring 1 and offspring 2 in the N+1th generation. The first tree of the Nth generation has its right sub-tree 2301 crossed over with a sub-tree 2302 of the second tree of the Nth generation. Regeneration of two tree structures by crossover is illustrated in the following example.

The sub-tree 2301 of the first parent tree is detached at the internal argument link 5, and the sub-tree 2302 of the second parent tree is detached at the internal argument link 5. The second sub-tree 2302 is substituted at the internal argument of the first tree of the Nth generation in order to produce the resultant first offspring tree, offspring 1.

Similarly, the first sub-tree 2301 is attached to the internal argument previously occupied by the second sub-tree 2302 in the second parent, in order to produce the second offspring tree, offspring 2 as shown in FIG. 23.

Figure 24:
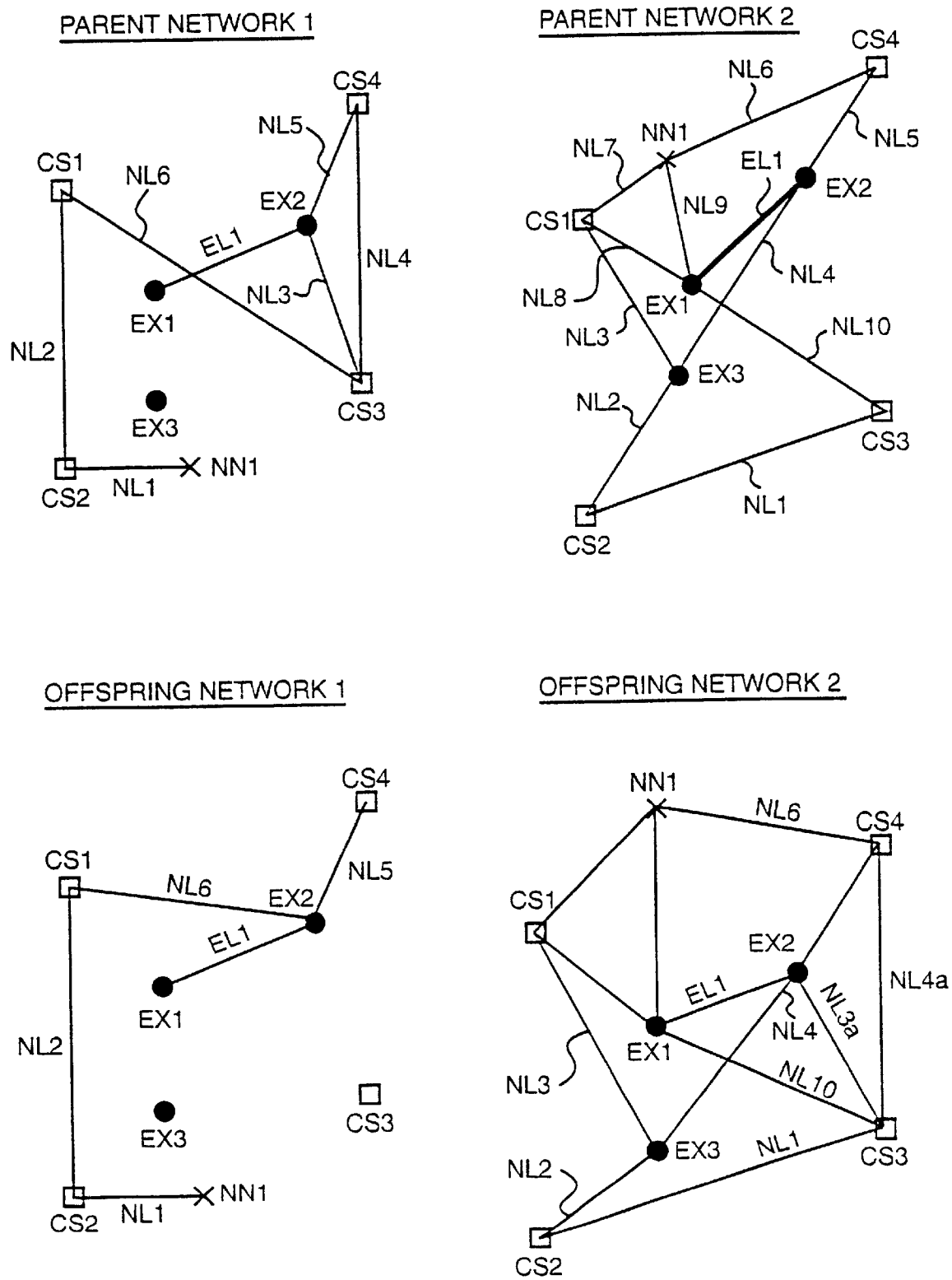
FIG. 24 shows visual displays as presented on a display device of parent and offspring network maps described by the parent and offspring tree structures of FIG. 23.

Referring to FIG. 24 of the accompanying drawings, there is shown the corresponding network designs constructed in accordance with the parent and offspring trees of the Nth and N+1th generations of FIG. 23. The network designs of FIG. 24 show only a display of the topology of the networks resulting from the trees. However, further information concerning the exchange capacity, link capacity, cost etc as described above is attached with the link and node signals. This information is also available within the tree representation data, although not displayed in the example topology displays of FIG. 24.

Referring to FIG. 24 the parent network 1 is described by the first parent tree as follows. The link signal link 1 creates a new link NL1 between the node signal CS2 and the node signal NN1. At the next level towards the root of the tree, the link signal link 2 searches its left argument for a node signal and finds node signal CS2 and then searches its right argument for a node signal and finds node signal CS1. The link signal link 2 then creates a new link NL2 between the node signals CS1 and CS2, corresponding to the new link NL2 between customer site I and customer site 2.

In the right sub-tree, starting from the outermost external leaves, the link signal link 3 creates a new link NL3 between node signal CS3 representing customer site 3 and node signal EX2 representing exchange 2. At the next level towards the root, at the root of the tree, the link signal link 4 searches its left argument and finds the node signal CS4 corresponding to customer site 4 and then searches its right argument for an external argument and finds node signal CS3 corresponding to customer site 3. Link signal link 4 creates a new link NL4 between node signal CS3 corresponding to customer site 3, and node signal CS4 corresponding to customer site 4.

At the next higher level in the right sub-tree, link signal link 5 searches its left argument and finds external node EL1 corresponding to existing link 1 between exchange signal EX1 corresponding to exchange 1, and exchange signal EX2 corresponding to exchange 2. Link signal link 5 then searches its right sub-tree and finds external argument CS4 corresponding to customer site 4. Since there is no existing link between node signal CS4 and node signal EL1, link signal link 5 creates a new link NL5 between node signal CS4 corresponding to customer site 4, and node signal EL1 corresponding to existing fink 1. Since node signal EL1 represents an existing link connected to exchanges EX1 and EX2, link signal link 5 creates the new link NL5 between customer site 4 and exchange 2, being at one end of the existing link 1 nearest the customer site 4. If customer site 4 had been geographically nearer to exchange 1 than to exchange 2, the link signal link 5 would have made the new link NL5 between customer site 4 and exchange 1. However, in this case since the exchange 2 is nearer to the customer site 4, the new link NL5 is created between exchange 2 and customer site 4.

The graft signal graft 6 joins the two networks comprising on the one hand CS1, CS2, NN1, NL1 and NL2, and on the other hand EX1, EX2, EL1, CS3, CS4, NL3, NL4 and NL5 at the nearest nodes, CS1 and CS3.

In this example, the viability condition is merely that all customer sites are connected. Thus, although exchange 3 represented by exchange signal EX3, is not connected, and although the node 1 represented by node signal NN1 is a dead end, since these do not affect the viability condition of all customer sites being connected, the network is still viable. However, since new node 1 appears to be unnecessary, it may be that the parent network 1 is not an optimal network since it requires creating the physical link 1 and terminal equipment at the new node 1, and yet this equipment seems to perform no function. The parent network 1 would not be optimal on the grounds of cost, although the redundant link 1 and redundant node 1 would not affect the performance of the rest of the system, and the network may be successful on the performance criteria.

The first tree of the Nth generation may be selected for performing the basis of the next generation, since although the network which it represents is not entirely successful in teems of the criteria of performance goals, cost goals, and reliability goals, it is viable and other trees of the Nth generation may give rise to networks which are not much better when measured by these criteria. The first tree of the Nth generation may be selected to form the basis of the next generation if, compared to other trees of the same generation, it is relatively successful. A successful tree could be described as a tree which, when measured against the appropriate predetermined fitness parameter, performance, reliability or cost, is within the top group or set of trees as measured by that goal. An identical tree in an early generation may be regarded as passing the fitness test, whereas the same identical tree appearing in a later generation may be regarded as an unfit tree. In the early generation, the average level of fitness of the other trees may be low, whereas in the later generation the average fitness of other trees may be high. As generations evolve, the average level of fitness as defined by the test parameters, is expected to increase. In the example of the first tree of the Nth generation, since this leads to a network which has the redundant new link 1 and new node 1, over a prolonged evolution of a large number of generations, this tree would be unlikely to survive, since at some stage it would be expected to fail the cost fitness criteria due to the unnecessary installation of the new link 1 and new node 1.

REWRITING OF TREES DURING CROSSOVER

In FIG. 23 herein, crossover of the sub-tree 300 with the parent tree produces the N+1th generation offspring tree, offspring 2. The tree offspring 2 has inconsistent link numbers, having a link 3 and a link 4 in the left sub-tree, and another link 3 and another link 4 in the right sub-tree.

A sub-process for rewriting the resultant offspring tree, whether produced by crossover, mutation or permutation, is as follows:

REWRITING OF NODE SIGNALS

There are four types of node signals to deal with. The main problems occur when the node signal represents an existing link. The process for rewriting the tree for each type of node signal is as follows. For a customer site node signal (ie this is a source or sink node which may have been prescribed as part of the specification of the original network problem under investigation), no change is required. For an existing node (ie a node which was prescribed after the specification of the original network problem), it is checked that the node identity number is not larger than the highest consecutively numbered node in the network. If it is, then the node identity number is substituted with 2 randomly chosen node within the network.

For a new node (ie a node which was randomly generated as an additional node for the network), it is checked that the node identity number is not larger than the highest consecutively numbered node in the network. If the node identity number is larger, then its identity number is changed to one more than the highest consecutively numbered node in the network. For example, if a network has M nodes, and the node identity number of the new node M+5, then the node identity number is changed to M+1. Then, a consistency check is run to ensure that any other references to the newly numbered node in the tree have the same node identity number and same characteristics as the node which has had its identity number changed.

For in existing link, represented as a node signal, if the existing link number is one more than the highest consecutively numbered link in the network, and refers to a blank link, then a new randomly generated link is created with the same number. If the link number is greater than the highest consecutively numbered link in the network, then another existing link is randomly chosen from the network instead. Once chosen, the existing link must itself be checked as follows in case an uncorrected link has been selected. If the newly chosen link has a link from a node to itself, then it is altered so that it goes to another legitimate node.

If the newly chosen link refers to any nodes which have identity numbers larger than the highest consecutively numbered node in the network, then another node is randomly chosen within the allowable range of numbered nodes, and is substituted for the node having the identity number larger than the highest consecutively numbered node. If the newly chosen link type is not set, then it is set to a randomly chosen legitimate value.

EXAMPLE 2

Figure 25:
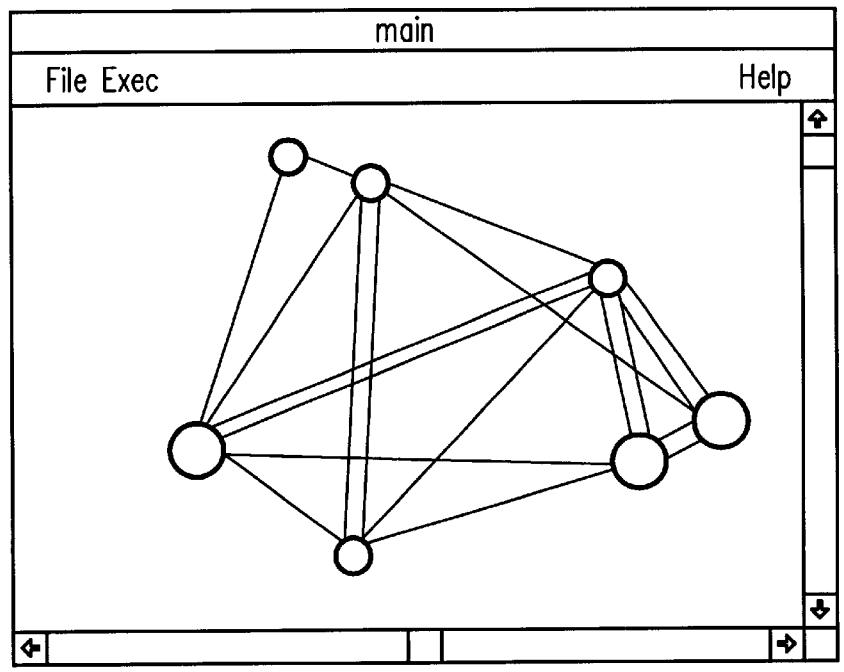
FIG. 25 illustrates a visual display as presented on a display device of a randomly generated network map as a first generation attempt solution to a second network design problem.
Figure 26:
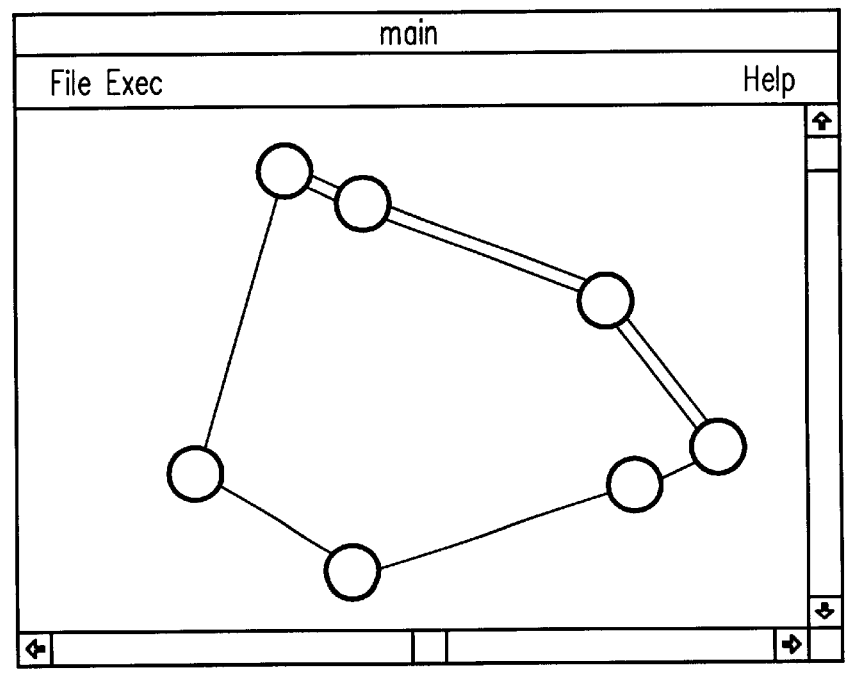
FIG. 26 illustrates a visual display on a display device of an optimized network map as an optimized solution to the second network design problem.

In another example, shown in FIGS. 25 and 26, a display is produced from network signals relating to a "before and after" network map achieved through the preferred process. FIG. 25, is a randomly generated design in the initial population. FIG. 26 shows the final optimized design after evolution of a number of generations. The displayed representations of the networks in FIGS. 25 and 26 in themselves do not contain all the information to describe the networks. The capacities and type of exchanges and customer sites are represented by the size of the visual representations, and the capacities of the links are described by the size dimension of the links. However other information corresponding to the link and exchange types are contained in the link and node signals supporting the representations of FIGS. 25 and 26. By printing out the link and node data signals from the computer, there may be produced a complete network design specification, including exchange and link types, capacities, and other physical specifications of the links and exchanges, together with instructions for their connection into the network.

Figure 27:
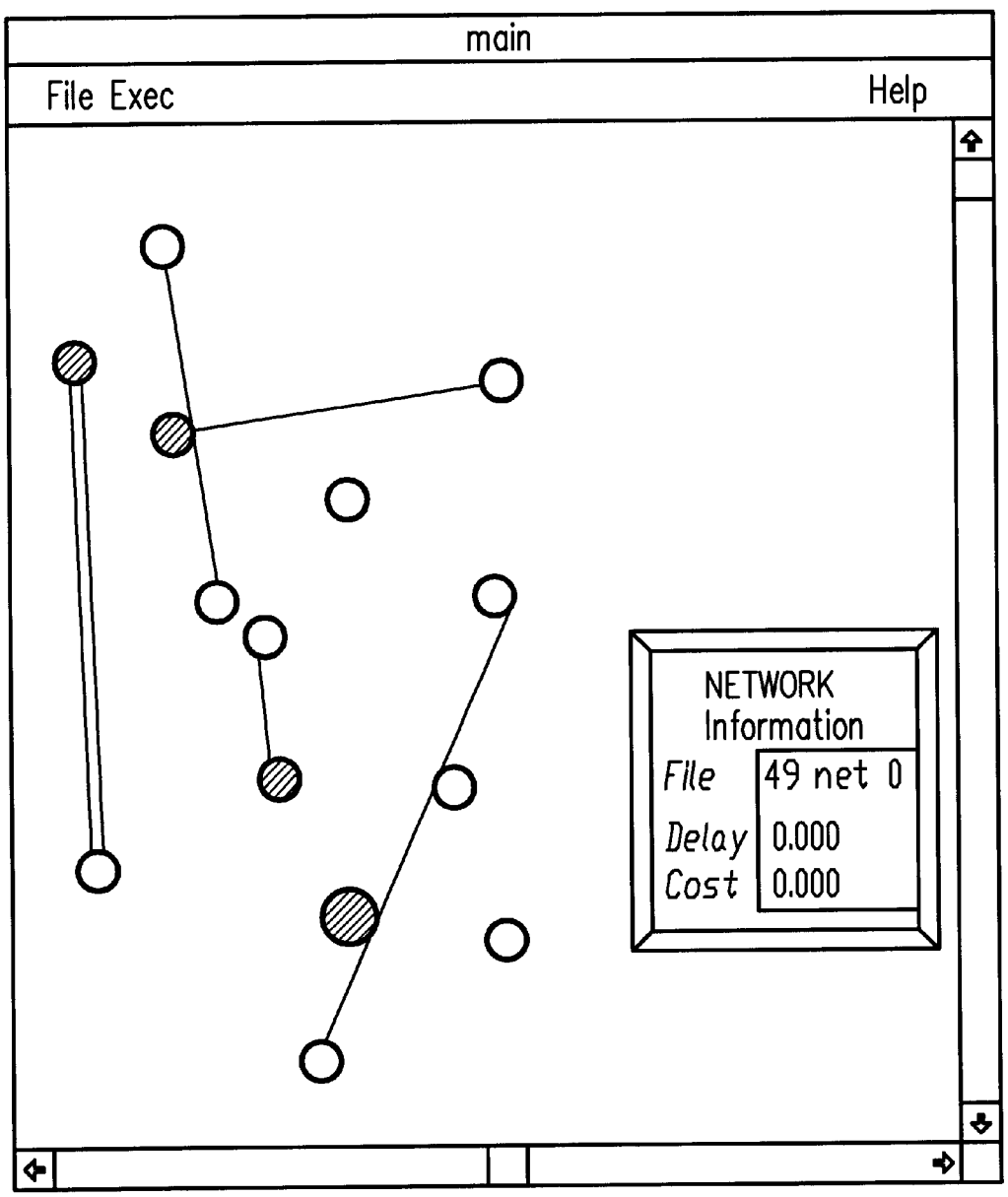
FIG. 27 shows a visual display on a display device of a set of initial network constraints and initial network assumptions for a third network design problem.

Referring to FIG. 27 herein, there is shown a display of an initial network constraint and initial assumptions data signals, in the form of a display showing customer sites, existing exchanges and existing links.

Figure 28:
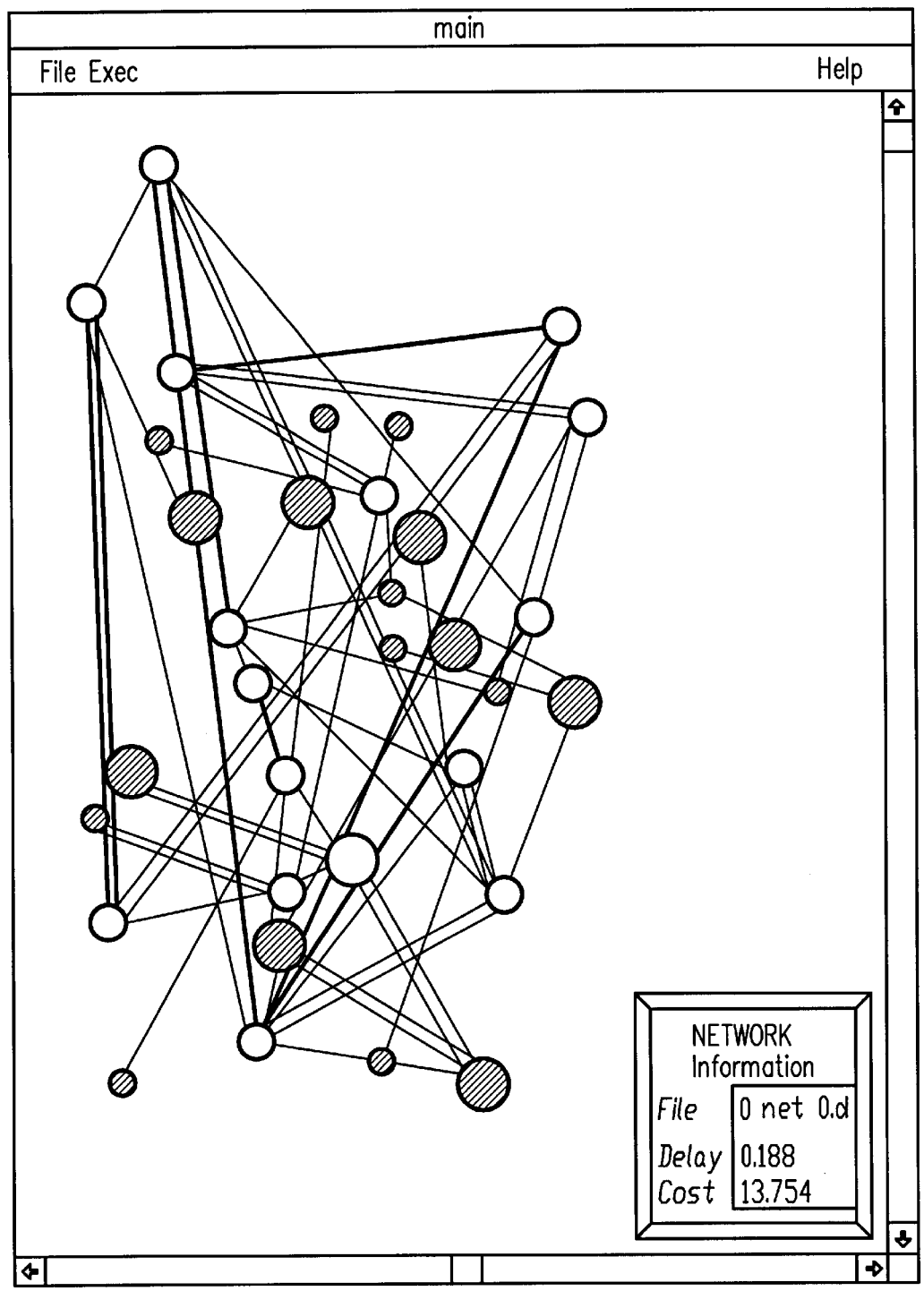
FIG. 28 shows a visual display on a display device of an initial generation network map representation, described by an initial generation randomly generated tree structure, including the constraints and assumptions of the network described by FIG. 26.

In FIG. 28 herein, there is shown a display of a set of first generation network signals corresponding to a first generation tree. There is much redundancy of node equipment and links in the network signals, derived from an optimized tree having undergone evolution over a number of generations.

Figure 29:
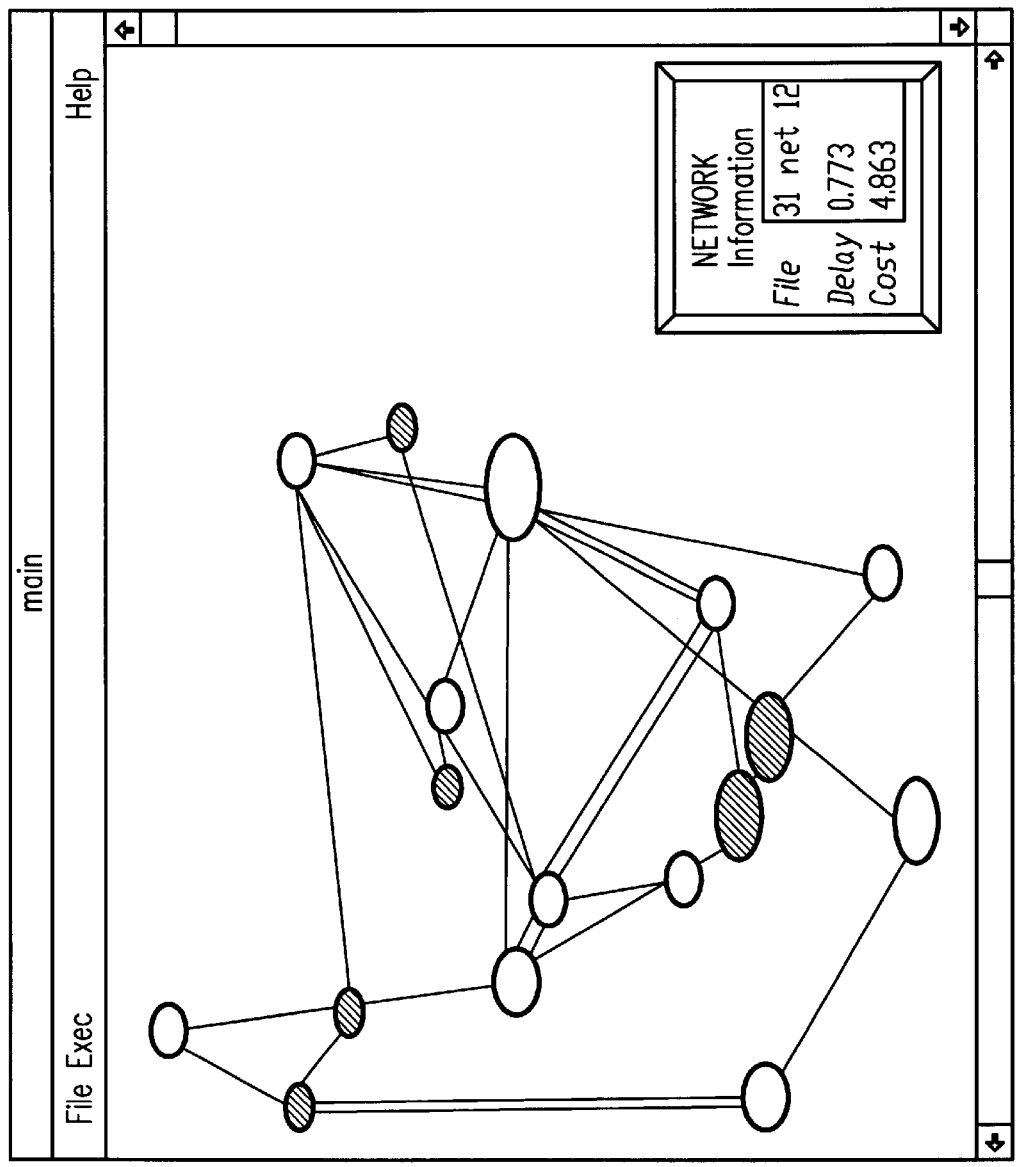
FIG. 29 shows a visual display on a display device of an optimized solution network map to the third network design problem having initial network assumptions, described by the display of FIG. 26.

The optimized network data signals, displayed visually on a display device in FIG. 29, includes a reduced number of node equipment and links compared to the first generation network data signals. A telecommunications network is constructed in accordance with the optimized network data signals.

What is claimed is:

1. A method of designing a telecommunications network having a plurality of switching nodes interconnected by a plurality of links, the method comprising:

(a) establishing a population of randomly generated tree structures comprising switching node signals and connecting signals;

(b) converting the population established by step (a) into corresponding network designs;

(c) testing said corresponding network designs for viability;

(d) testing for fitness those network designs which pass the viability test of step (c);

(e) determining from those network designs which pass the fitness test of step (d) a preferred network design;

(f) establishing a new population of tree structures comprising tree structures generated by genetic evolution from randomly generated tree structures representing network designs which pass the fitness test of step (d);

(g) converting the new population of tree structures established by step (f) into corresponding network designs;

(h) repeating steps (c), (d), (e) and (f) thereby obtaining a succession of respective preferred network designs; and (i) determining from said succession of respective preferred network designs a most preferred network design, wherein the step (a) comprises the sub-steps of:
(a1) randomly generating a tree structure comprising switching node signals and connecting signals;
(a2) converting the randomly generated tree structure into a corresponding network design;
(a3) selecting the randomly generated tree structure as a member of the population if it passes the viability test of step (c);
(a4) repeating steps (a1), (a2) and (a3) until the population reaches a predetermined size; and wherein
each said connecting signal has a left argument and a right argument and is either a link signal or a graft signal,
each link signal argument is a switching node signal or another link signal, and
each graft signal argument is a link signal or another graft signal.

2. A method according to claim 1, wherein the switching node signals of each of the tree structures have unique identifiers in accordance with a given tree traversal convention, and the connecting signals of each of the tree structures have unique identifiers in accordance with that tree traversal convention, and wherein step (f) comprises the substeps of:

(f1) interchanging a subtree of a first of the tree structures representing network designs which pass the fitness test of step (d) with a subtree of a second of the tree structures representing network designs which pass the fitness test of step (d) and thereby generating two offspring tree structures;

(f2) verifying that the respective unique identifiers of the switching node signals and connecting signals of the newly generated offspring tree structures are consistent with that tree traversal convention; and in the event that a switching node signal or connecting signal of a newly generated offspring tree structure is found by substep (f2) to have an identifier that is inconsistent with that tree traversal convention, (f3) determining a correct value for that inconsistent identifier; and (f4) changing all occurrences of that inconsistent identifier in the offspring tree structure into said correct value.

3. A method according to claim 2, wherein the substep (f2) comprises the substeps of:

(f2.1) in the event that, in accordance with that given tree traversal convention, a node signal is encountered having a number which is more than one higher than the highest consecutive node signal number allocated so far in a renumbering process, renumbering that node signal so encountered to be one higher than the highest consecutive node signal number allocated so far in the renumbering process; and (f2.2) changing any reference of the tree structure which refers to that node signal by using its previous number to a reference which refers to that node signal by using its new number.

4. A computer-readable medium containing computer-executable program instructions for performing the method of claim 1.

5. A computer system programmed to perform the method of claim 1.

6. A method according to claim 1, wherein substep (a2) comprises the substeps of:

(a2.1) traversing the tree structure and upon encountering a tree node formed by a connecting signal, (a2.2) if that connecting signal is a graft signal, searching respective sub-trees formed by the left and right arguments of that connecting signal to find any existing link therebetween, (a2.2.1) if no such link between the respective sub-trees is found, creating a new link between an external tree node of one of the respective sub-trees and an external tree node of the other of the respective sub-trees;

(a2.3) if that connecting signal is a link signal, searching said respective sub-trees to find any existing link between a first switching node signal of the sub-tree formed by the left argument of that connecting signal and a second, different, switching node signal of the respective sub-tree formed by the right argument of that connecting signal, (a2.3.1) if no such link between the said first and second switching node signals is found, creating a new link between said first and second switching node signals; and (a2.4) if no such second, different, switching node signal is found in the sub-tree formed by the left argument of that connecting signal, converting that connecting signal to a graft signal, and performing substep (a2.2).

7. A method according to claim 6, wherein substep (a2.2.1) comprises selecting said external tree nodes of the respective sub-trees on the basis of the shortest physical distance between actual telecommunications network nodes represented by external tree nodes of the respective sub-trees.

8. A method according to claim 7, wherein, in substep (a2.2.1), if said shortest physical distance is greater than a predetermined value, the creation of a new link between the selected external tree nodes comprises creating a tree node formed by a switching node signal and representing an switching node intermediate said actual telecommunications network nodes represented by external tree nodes of the respective sub-trees.

9. A method according to claim 1, wherein the switching nodes represent pieces of node equipment and the locations of the pieces of equipment.

10. A method according to claim 1, wherein step (d) comprises testing against a cost criteria.

11. A method according to claim 1, wherein the link signals are used to create sub-trees and the graft signals are used to connect the sub-trees into an overall tree structure having a single root.

12. A computer-readable medium containing computer-executable program instructions for performing the method of claim 11.

13. A computer system programmed to perform the method of claim 11.

14. A method according to claim 1, wherein the link signals describe information about physical link equipment and their connection pattern to switching node equipment and the graft signals denote the joining of physical links or sub-networks at switching node equipment.

* * * * *